(12) United States Patent
Trotter et al.

(10) Patent No.: US 11,480,277 B2
(45) Date of Patent: Oct. 25, 2022

(54) QUICK CONNECTOR WITH POSITIVE LOCK INDICATION

(71) Applicant: ILLINOIS TOOL WORKS INC., Glenview, IL (US)

(72) Inventors: Jason Trotter, Des Plaines, IL (US); Nedim Vrtagic, Des Plaines, IL (US); Joseph C. Kuhn, Des Plaines, IL (US)

(73) Assignee: Illinois Tool Works Inc., Glenview, IL (US)

( * ) Notice: Subject to any disclaimer, the term of this patent is extended or adjusted under 35 U.S.C. 154(b) by 606 days.

(21) Appl. No.: 16/465,338

(22) PCT Filed: Nov. 22, 2017

(86) PCT No.: PCT/US2017/062985
§ 371 (c)(1),
(2) Date: May 30, 2019

(87) PCT Pub. No.: WO2018/102213
PCT Pub. Date: Jun. 7, 2018

(65) Prior Publication Data
US 2019/0390808 A1    Dec. 26, 2019

Related U.S. Application Data

(60) Provisional application No. 62/428,815, filed on Dec. 1, 2016.

(51) Int. Cl.
*F16L 37/088*   (2006.01)

(52) U.S. Cl.
CPC ....... *F16L 37/0885* (2019.08); *F16L 2201/10* (2013.01)

(58) Field of Classification Search
CPC ....... F16L 37/10; F16L 37/101; F16L 37/105; F16L 37/22; F16L 37/24; F16L 37/244;
(Continued)

(56) References Cited

U.S. PATENT DOCUMENTS

| 4,948,176 A | 8/1990 | Bartholomew |
| 2006/0082146 A1 | 4/2006 | Heim et al. |

(Continued)

FOREIGN PATENT DOCUMENTS

| EP | 1677042 A1 | 7/2006 |
| EP | 2612689 A1 | 7/2013 |

(Continued)

OTHER PUBLICATIONS

Translation WO2016021612 (Year: 2016).*
(Continued)

*Primary Examiner* — Aaron M Dunwoody
(74) *Attorney, Agent, or Firm* — Quarles & Brady LLP

(57) ABSTRACT

A quick connector assembly includes a male adapter portion (24) having an end and a groove (62) formed therein spaced from the end. The male adapter portion has a through bore. A female housing portion (22) has a body having a through bore generally concentrically aligned with the male adapter portion through bore. A ring (26) cooperates with the female housing portion and the male adapter portion. The ring is in a first position when the male adapter is engaged with the female housing and a second position, different from the first position, when the male adapter is other than engaged with the female housing. The first and second positions can be visually different from one another.

9 Claims, 26 Drawing Sheets

(58) Field of Classification Search
CPC ..... F16L 37/12; F16L 37/0885; F16L 37/088;
F16L 37/0887
USPC ............................ 285/314, 315, 316, 86, 84
See application file for complete search history.

(56) References Cited

U.S. PATENT DOCUMENTS

| | | |
|---|---|---|
| 2013/0175795 A1 | 7/2013 | Taylor et al. |
| 2015/0345684 A1 | 12/2015 | Kujawski, Jr. |
| 2017/0227153 A1* | 8/2017 | Nezu .................. F16L 37/1225 |

FOREIGN PATENT DOCUMENTS

| | | |
|---|---|---|
| EP | 3179148 A1 | 6/2017 |
| WO | 2013/070865 A1 | 5/2013 |
| WO | 2016021612 A1 | 2/2016 |
| WO | 2016/081590 A1 | 5/2016 |

OTHER PUBLICATIONS

Search Report for European Patent Application No. 20174975.1, dated Sep. 25, 2020. (8 pages).
International Search Report for PCT/US2017/062985, dated Feb. 19, 2018.
Substantive Examination Report from related European Patent Application No. 17817445.4, dated May 10, 2021, 8 pages.

* cited by examiner

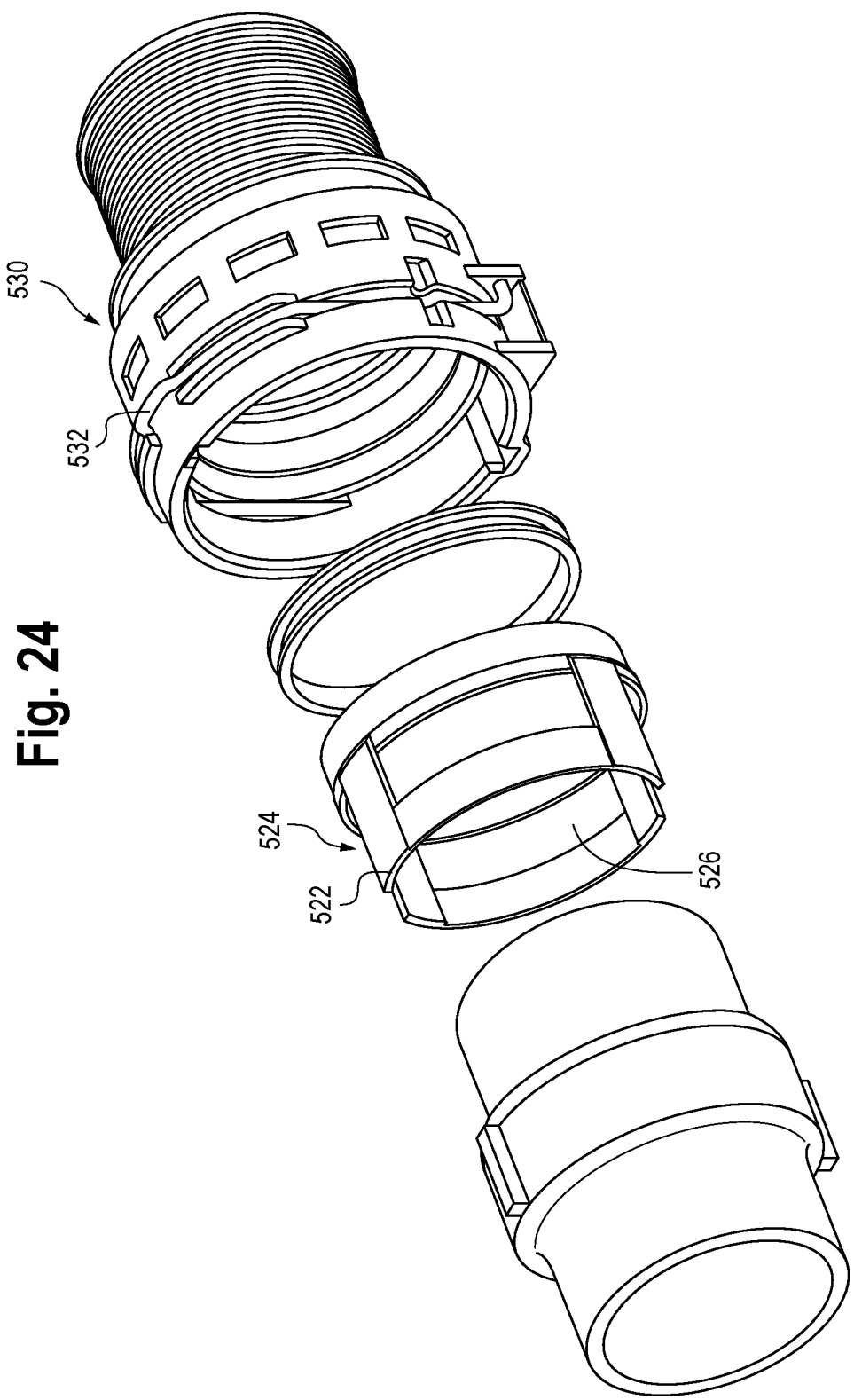

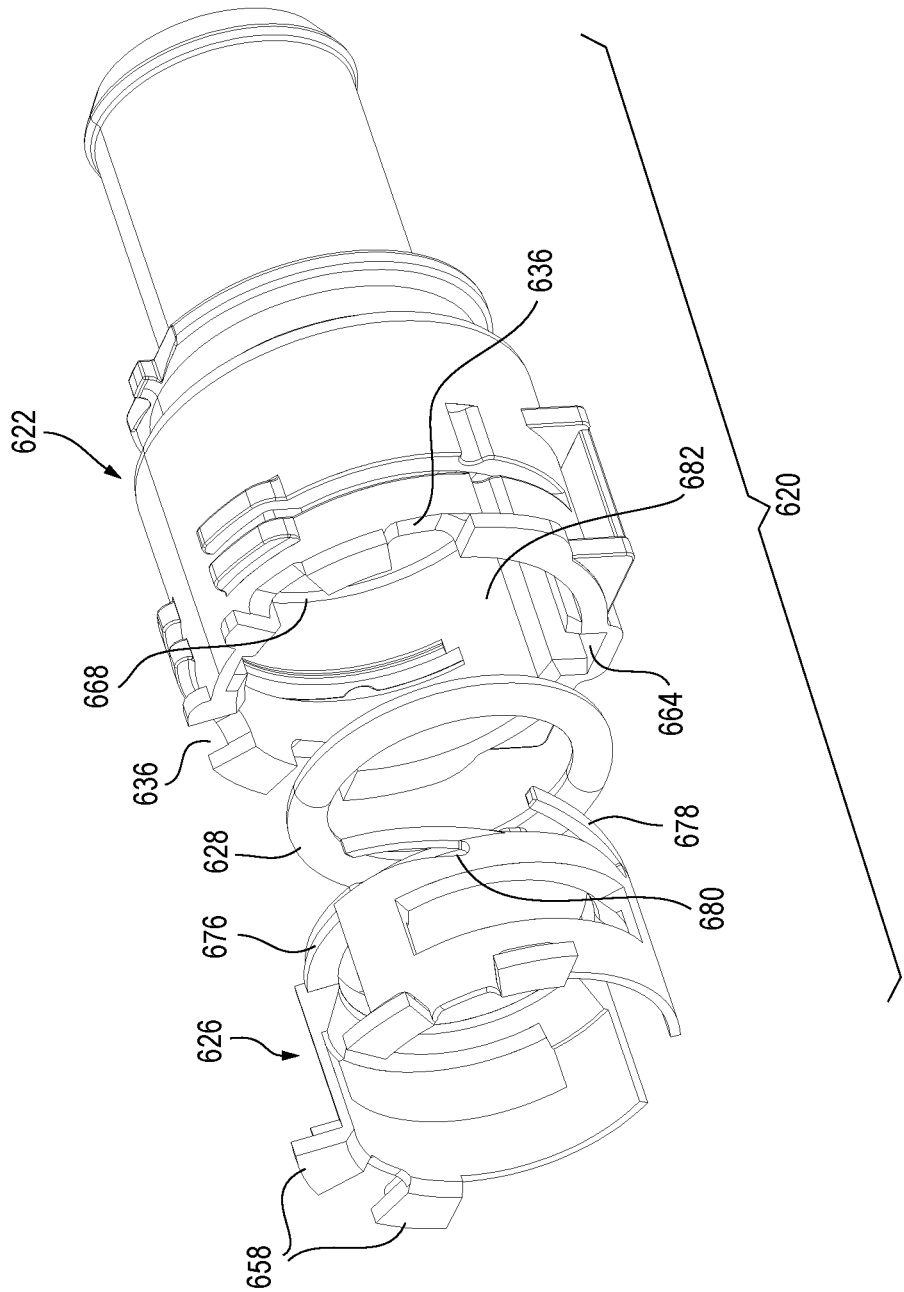

QUICK CONNECTOR WITH POSITIVE LOCK INDICATION

RELATED APPLICATIONS

This application represents the United States National Stage of International Application No. PCT/US2017/062985, filed Nov. 22, 2017, which claims priority to U.S. Provisional Patent Application No. 62/428,815, entitled "Quick Connector with Positive Lock Indication," filed Dec. 1, 2016, which are hereby incorporated by reference in their entirety.

BACKGROUND

Many fluid line systems use quick connect/quick disconnect couplings. For example, quick connect couplings are used in transportation vehicles, such as the automotive and airline industries to establish and maintain reliable connections is various fluid systems, such a coolant systems, hydraulic systems and the like.

In the automotive and other industries quick connect couplings are used to provide connection between two components, conduits and between components and conduits, such as hoses and the like. Couplings typically include a male adapter that is received in a female connector housing. The female connector housing can be formed from plastic or metal, as appropriate for the specific application.

In known connectors, an O-ring seal on the male adapter or in the female housing forms a seal with the other portion when the male adapter is properly seated within the female housing. The O-ring seats in an O-ring groove and is maintained in place in the female housing by a sealing ring. The sealing ring also prevents axial movement or twisting of the O-ring to assure a proper seal and to prevent unwanted stresses on the O-ring.

A spring clip of metal or a like spring material is positioned on the housing between the sealing ring and the entrance to the housing. The clip is seated in grooves formed in and through the housing and extends into and through the sides of the housing. As the male adapter is inserted into the housing the adapter advances through and beyond the O-ring, the O-ring expands to form a fluid tight seal between the adapter and the housing. At the same time, the legs of the clip are urged outwardly. When the male adapter is fully seated in the housing, the legs of the clip fall into a radial groove in the male adapter to lock the male adapter in the housing. The adapter can be removed from the housing by lifting the clip from the housing (and the adapter radial groove) and pulling the adapter from the housing. Examples of quick connect couplings are disclosed in WO 2013/070865 and WO 2016/081590.

While known connector couplings function well to provide a positive seal, and to lock the male adapter to the housing, there is no visual or tactile indication to indicate that the adapter is fully inserted in or locked to the housing. As such it is only the "snap" of the clip into the radial groove that provides any indication of proper seating.

Accordingly, there is a need for a quick connect coupling having a female housing and a male adapter that provides visual and/or tactile indication of proper seating of the male adapter in the female housing.

SUMMARY

A quick connector assembly includes a male adapter portion having an end and a groove formed therein spaced from the end, and a through bore. A female housing portion is coupled to the male adapter. The female housing has a body having a through bore generally concentrically aligned with the male adapter through bore.

A ring cooperates with the female housing and the male adapter. The ring is in a first position when the male adapter is engaged with the female housing and is in a second position, different from the first position, when the male adapter is other than engaged with the female housing. In an embodiment, the first and second positions are visually different from one another. In an embodiment, tactile indication is provided.

In an embodiment, an end of the housing includes one or more pockets formed therein and the ring includes one or more projections configured to cooperate with the pockets. The cooperating pockets and projections provide visual and tactile indication that the male adapter is engaged with the female housing. The series of pockets and projections can be circumferentially arranged around the female housing and the ring, respectively, such that the ring will engage the female housing only in a single circumferential orientation.

In an embodiment, the female housing includes a pair of opposing elongated circumferential openings, and the connector assembly includes a spring clip having legs disposed in the opposing elongated circumferential openings. The spring clip legs are configured to cooperate with and engage a groove in the male adapter to secure the male adapter in the female housing.

In an embodiment, the ring is a rotating twist ring and includes one or more windows therein. The female housing includes one or more inwardly oriented flexible catch elements that, in a resting state, are flush with an outside surface of the female housing. In such an embodiment, less than full insertion of the male adapter into the housing moves or flexes the catch elements from the resting state into the windows and interferes with rotation of the twist ring. Full insertion of the male adapter into female housing allows the catch elements to return to the resting state and move out of the windows, so as to not interfere with rotation of the twist ring.

When the male adapter is fully engaged with the female housing, the twist ring is rotated so that the windows are out of alignment with the catch elements, the catch elements are prevented from moving outwardly and the male adapter is thus secured in the female housing.

In such an embodiment, circumferential channels can be formed along an end of and adjacent the catch elements, and the ring can include inwardly projecting tongues adjacent to the windows such that the tongues traverse through the channels as the ring is rotated to align the windows with the catch elements.

In an embodiment the female housing includes a radial shoulder at an interior portion thereon and the connector assembly includes a seal positioned in the female housing abutting the radial shoulder. When the male adapter is engaged with the female housing the seal is urged against the radial shoulder. The connector assembly can include a sliding ring outboard of the seal so that the male adapter engages the sliding ring to urge the seal against the radial shoulder. The seal can be, for example, a V-seal.

In an embodiment, the ring is a rotating twist ring having pockets for receiving the spring clip legs when the female housing is in an unlocked state. In such an embodiment, the sliding ring includes a tab to interfere with rotating the twist ring when the male adapter is disengaged from the female housing. When the male adapter is engaged with the female housing the sliding ring is urged inwardly of the female housing moving the tab out of interfering with movement of the twist ring and the spring clip legs are urged inwardly to engage the groove in the male adapter to secure the male adapter in the female housing. The twist ring and the female housing can include visual indicia to indicate when the twist ring is in a locked position and an unlocked position.

In an embodiment the connector assembly includes an external sliding indicator ring positioned on the housing. The external sliding indicator ring includes a pair of circumferentially spaced inwardly oriented flexible first tabs that engage a pair of channels in the housing body. The first tabs engage the channels as the sliding indicator ring slides between a first position in which the ring indicates that the male adapter is not fully engaged with the housing and second position in which the ring indicates that the male adapter is fully engaged with the housing. The sliding indicator ring includes a release tab movable within a release tab channel formed in one of the first tab channels. The release tab flexes between a locked position and a release position to lock and permit movement, respectively, of the sliding indictor ring between the first and second positions.

In an embodiment, the housing includes a plurality of circumferentially disposed windows therein. The connector assembly includes a ring positioned internally of the female housing. The ring has first and second colors thereon along longitudinally disposed sections of the ring. When the first color is visible in the windows the ring indicates that the male adapter is not fully engaged with the housing and when the second color is visible in the windows the ring indicates that the male adapter is fully engaged with the housing.

In an embodiment, the connector assembly includes an internal sliding indicator ring positioned in the female housing. The internal sliding indicator ring has a portion that is visible between the female housing and the male adapter when the male adapter is not fully engaged with the housing and is not visible when the male adapter is fully engaged with the housing.

In an embodiment, the ring includes at least one biasing element and the female housing portion body includes an abutment portion. The biasing element cooperates with the abutment portion to bias the ring to the second position. In an embodiment, the biasing element is a helical formed leg extending from about an end of the ring. The ring can include a plurality of helical formed legs. Pockets can be formed in the ring that cooperate and receive with the legs when the male adapter is fully engaged with the female housing.

In an embodiment, the ring includes a pair of longitudinally extending flexible legs depending from about an end thereof. In such an embodiment the female housing includes a receiving region on an inner surface thereof for receiving the legs. The receiving region can be formed to include a wedge-shaped projection cooperating with the longitudinally extending flexible legs to bias the ring to the second position. In an embodiment, the connector assembly includes a pair of longitudinally extending flexible legs in opposing relation to one another and a pair of wedge-shaped projection in opposing relation to one another. The connector can include two pairs of longitudinally extending flexible legs, each pair in opposing relation to each other and two pairs of wedge-shaped projection each pair in opposing relation to each another. In such embodiments, the biasing element can further function to prevent rotation of the sealing ring relative to the housing.

It will also be appreciated that in such embodiments the sealing ring is translated between the seated and unseated positions by a component other than the seal, by an axial force, e.g., by a biasing element, such as a sealing ring having linear or longitudinal legs that cooperate with wedges or spiral (or helical) legs that cooperate with the abutment wall, to unseat the sealing ring from the housing.

These and other features and advantages of the present disclosure will be apparent from the following detailed description, in conjunction with the appended claims.

BRIEF DESCRIPTION OF THE DRAWINGS

The benefits and advantages of the present device will become more readily apparent to those of ordinary skill in the relevant art after reviewing the following detailed description and accompanying and drawings, wherein:

FIG. 24 is an exploded view of still another embodiment of the quick connector;

FIGS. 26A and 26B are exploded and perspective views of the female housing still another embodiment of the quick connector.

DETAILED DESCRIPTION

Figure 1:
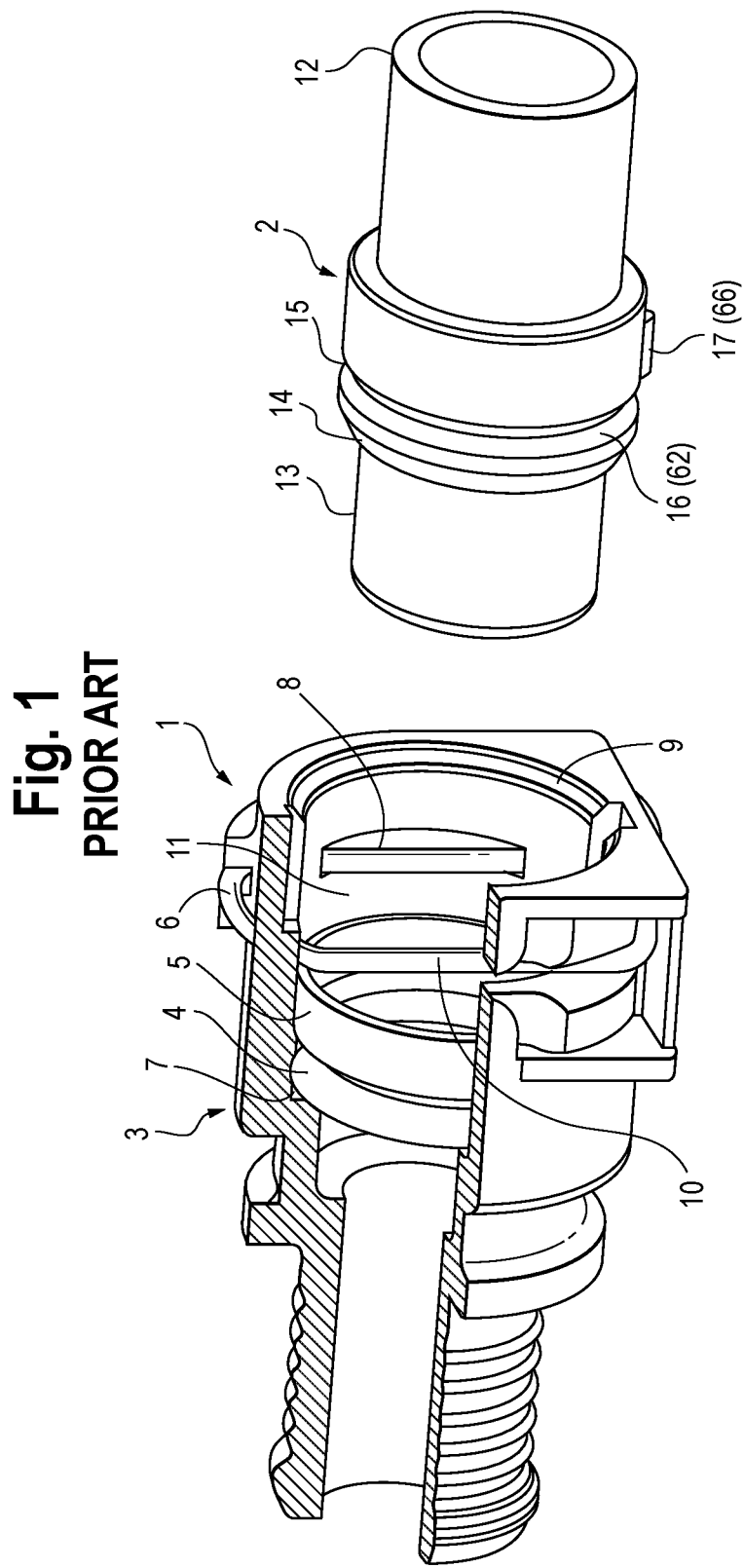
FIG. 1 is perspective cut away view of a known quick connect coupling.
Figure 2:
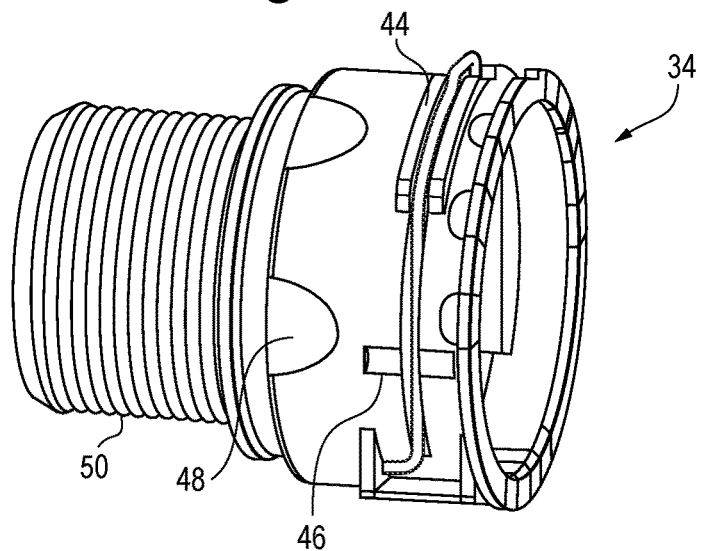
FIG. 2 is a perspective view of an embodiment of a quick connect coupling or quick connector with positive lock indication.

While the present device is susceptible of embodiment in various forms, there is shown in the drawings and will hereinafter be described presently preferred embodiments with the understanding that the present disclosure is to be considered an exemplification of the device and is not intended to be limited to the specific embodiments illustrated.

FIG. 1 illustrates an example of a known quick connector coupling 1. The coupling 1 includes, generally, a male adapter 2, a female housing 3, an O-ring 4, a sealing ring 5 and a spring clip or clamp 6. The O-ring is fitted into an O-ring groove 7 in the female housing 3. The sealing ring 5 is positioned in the female housing 3, abutting the O-ring 4. The housing 3 includes a pair of opposing elongated circumferential openings 8 between an open end 9 of the housing 3 and the sealing ring 5. The spring clip 6 is positioned on the housing 3 such that legs 10 of the clip 6 are positioned in the circumferential openings 8 and extend into an interior 11 of the housing 3.

The male adapter 2 includes a first or outer end 12 and a second or inner end 13 (inner referring to that end that inserts into the female housing 3). A sloped collar 14 and a stop wall 15 are positioned intermediate the outer and inner ends 12, 13 and define a groove 16 therebetween. The sloped collar 14 is positioned between the stop wall 15 and the inner end 13. When the adapter 2 is inserted into housing 3, the clip legs 10 ride up on the sloped collar 14 and fall or lock into the groove 16 in the adapter 2 to secure the adapter 2 and housing 3 to one another. The male adapter 2 can also include an aligning projection 17. When secured to one another, the made adapter 2 passes though the sealing ring 5 and O-ring 4 and forms a seal between the adapter 2, the O-ring 4 and the housing 3.

Referring now to FIGS. 2-6, there is shown an embodiment of a quick connector with positive locking indication 20. The connector 20 includes generally, a female housing 22 assembly that cooperates with, e.g., receives a male adapter 24. The female housing assembly 22 includes an extended sealing ring 26, a seal 28 and a spring clip 30. In an embodiment the seal 28 can be a V-seal, such as that illustrated in FIG. 3. Other types and configurations of seals can be used, such as O-ring seals and will be recognized by those skilled in the art. The spring clip 30 is of a known type in which the legs 32 are biased inwardly; that is the legs 32 are biased toward one another.

The housing 22 includes an inlet end 34 having a series of pockets 36 formed therein. A ring groove 38 (V-ring or O-ring groove as the case may be) is present in the body 40 of the housing 22, spaced from the inlet 34. It will be appreciated that other types and profiles of seals and cooperating ring grooves can be used and are within the scope and spirit of the present disclosure. A pair of opposing elongated circumferential openings 42 are formed in the body 40, between the inlet end 34 and the ring groove 38. The body 40 can include a guide 44, such as the upstanding guide walls to maintain the spring clip 30 positioned on the body 40, clip end rests 46, finger recesses 48 to assist a user in grasping and manipulating the housing 22 and a connecting end 50, to which a hose or component is connected to the housing 22.

Referring again to the pockets 36, in an embodiment, the pockets 36 are elongated semi-circular shaped niches formed in the inlet end 34 of the body 40. The pockets 36 can be irregularly circumferentially spaced from one another. The pockets 36 can be the same size and shape or can have different sizes and shapes from one another.

Figure 3:
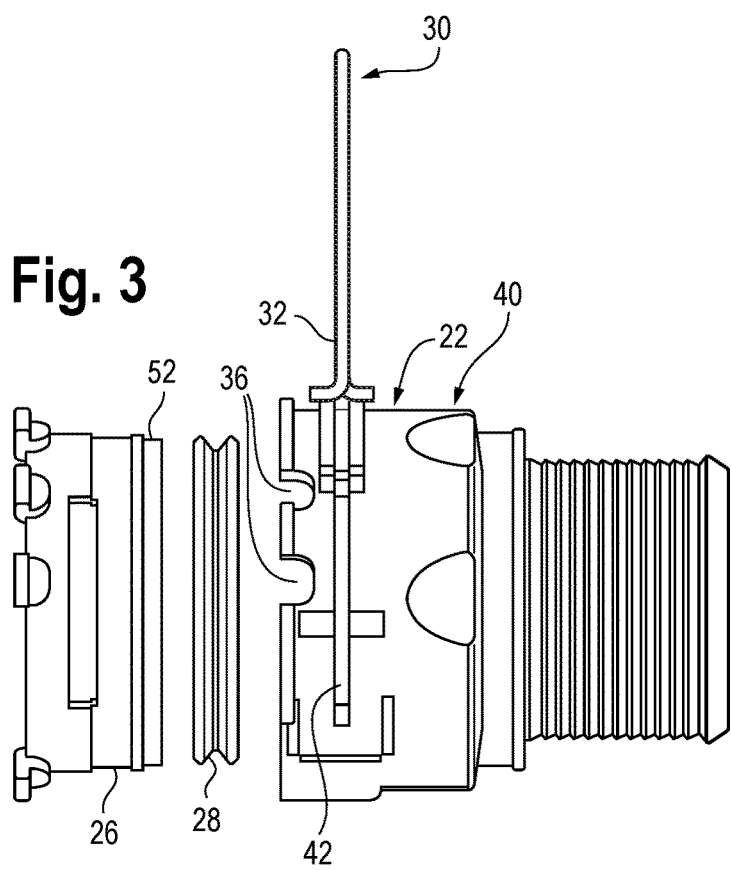
FIG. 3 is an exploded view of the connector of FIG. 2.

The extended sealing ring 26 is best illustrated in FIG. 3. The ring 26 includes a ring abutment portion 52 that abuts the seal 28 (V-ring or O-ring seal), a body portion 54 and an end portion 56. The end portion 56 includes a series of projections or lips 58 that cooperate with the pockets 36 in the housing body 40. In this manner, when the sealing ring 26 is properly seated in the housing 22, the ring 36 abuts the seal 28 and the ring projections 58 are positioned in the housing pockets 26 to provide visual indication that the 26 ring is properly positioned in the housing 22 and that the male adapter 24 is properly seated in the housing 22.

The sealing ring 26 can also include a pair of opposing elongated circumferential openings 60 formed in the body 40 so that when the sealing ring 26 is fully positioned in the housing 22, the openings 60 are aligned with the opposing elongated circumferential openings 42 formed in the housing body 40. In addition, when the sealing ring 26 is fully seated within the housing 22, the housing openings 42 and the ring openings 60 are aligned with one another which permits the spring clip legs 32 to open within the openings 42, 60 to engage and secure the adapter 24 to the housing 22.

In an embodiment, the sealing ring 26 includes one or more longitudinal aligning channels 64 to accommodate one or more cooperating aligning projections 66 on the male adapter 24. Mating the male adapter aligning projections 66 with the aligning channels 64 facilitates properly circumferentially aligning the male adapter 24 with the female housing 22 (to properly align the components/conduits that are being connected by the quick connect coupling 20).

Figure 6:
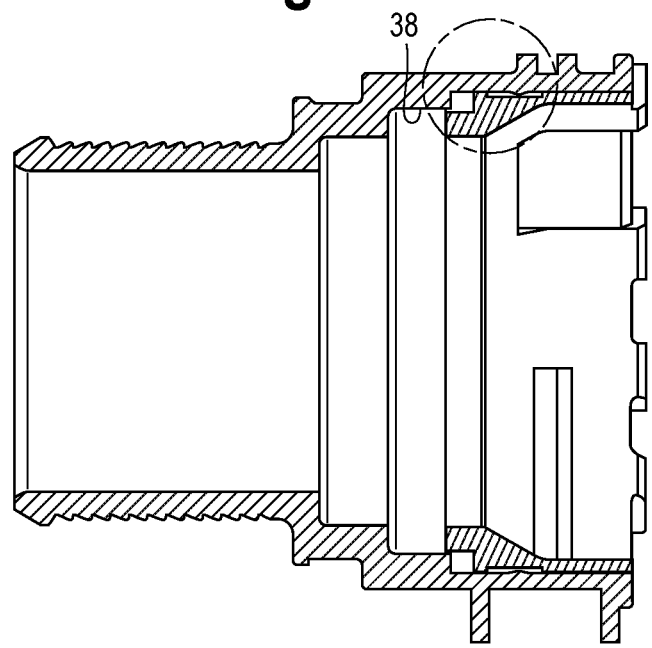
FIG. 6 is a sectional illustration of the female housing showing a retaining nub.
Figure 6A:
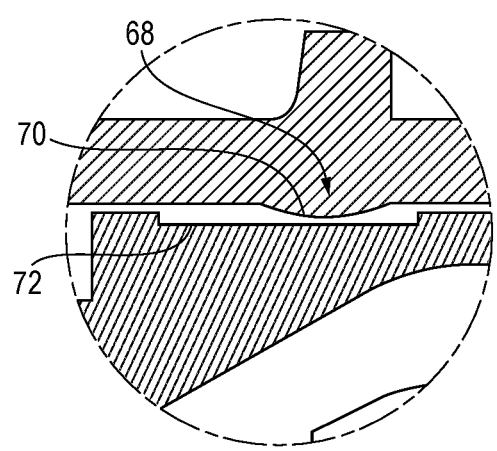
FIG. 6A is a detailed view of the retaining nub of FIG. 6.
Figure 7:
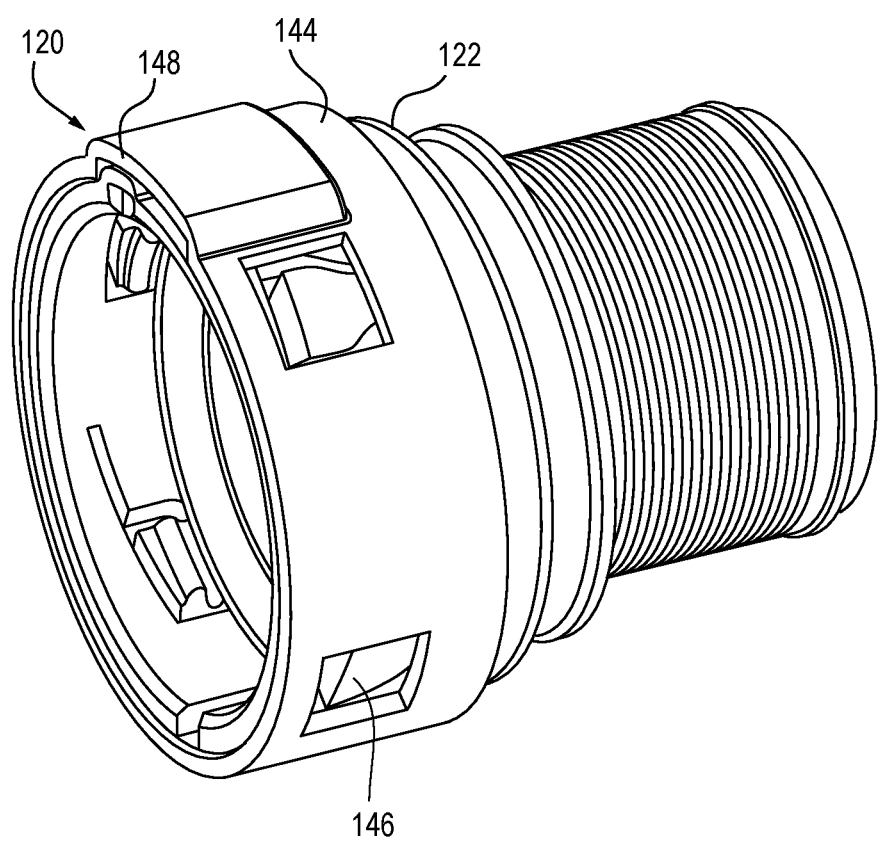
FIG. 7 is a perspective view of another embodiment of the quick connector.
Figure 8:
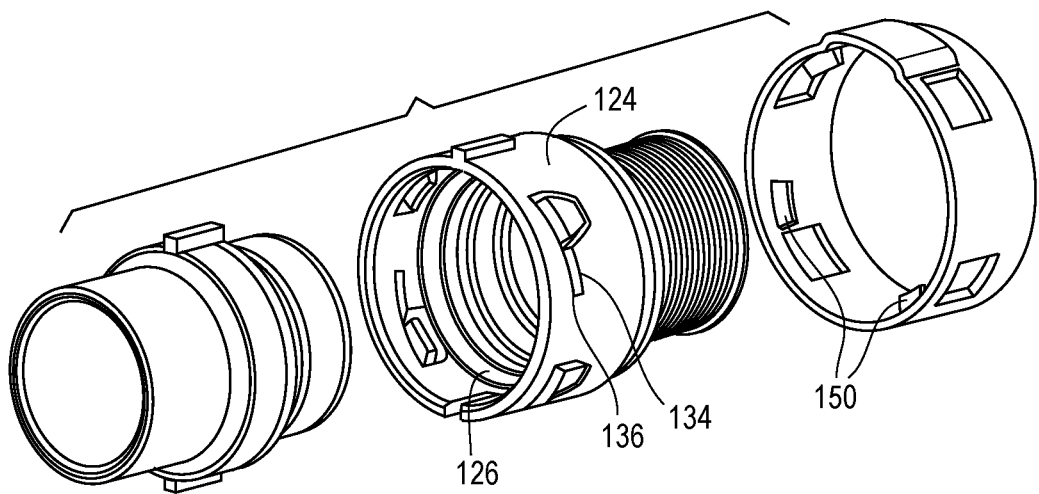
FIG. 8 is an exploded view of the connector of FIG. 7.
Figure 10:
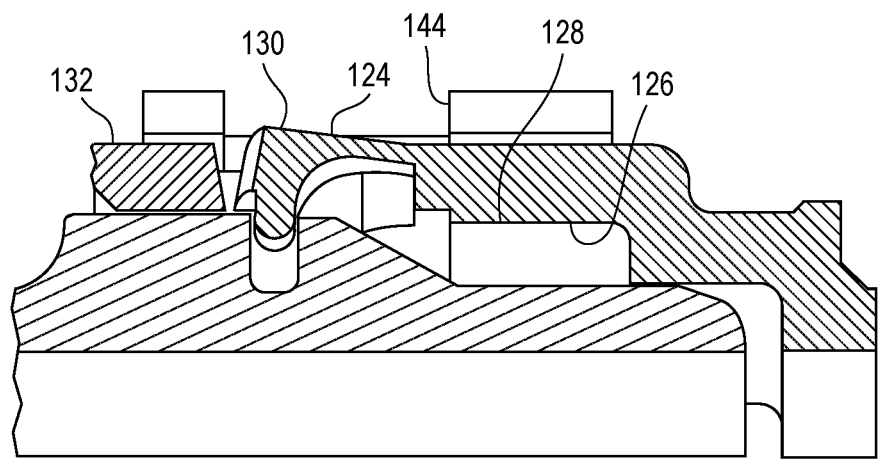
FIG. 10 is a partial sectional view showing a female housing catch element engaging a groove in the male adapter.
Figure 9A:
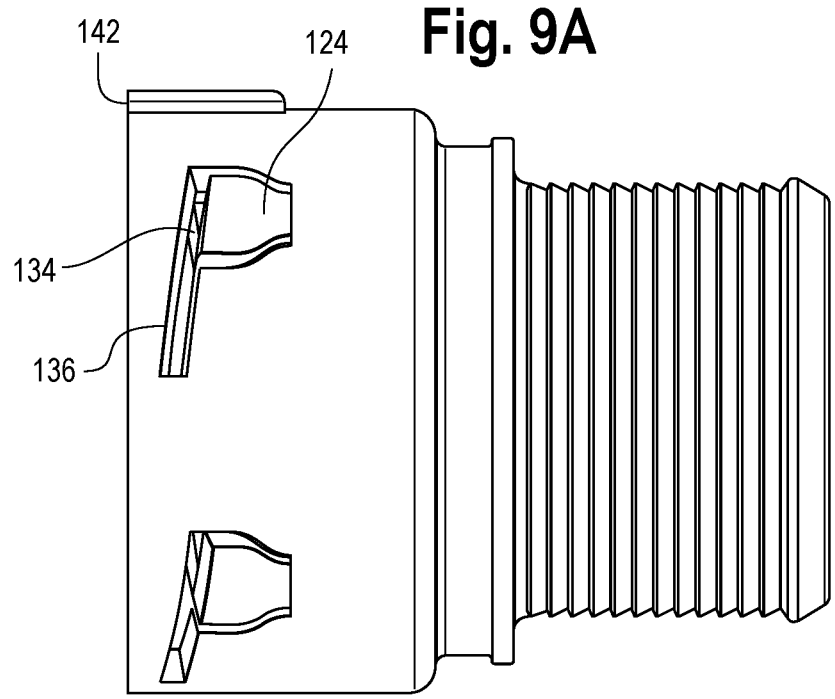
FIGS. 9A and 9B are side and perspective views of the female housing of the connector of FIGS. 7 and 8.
Figure 9B:
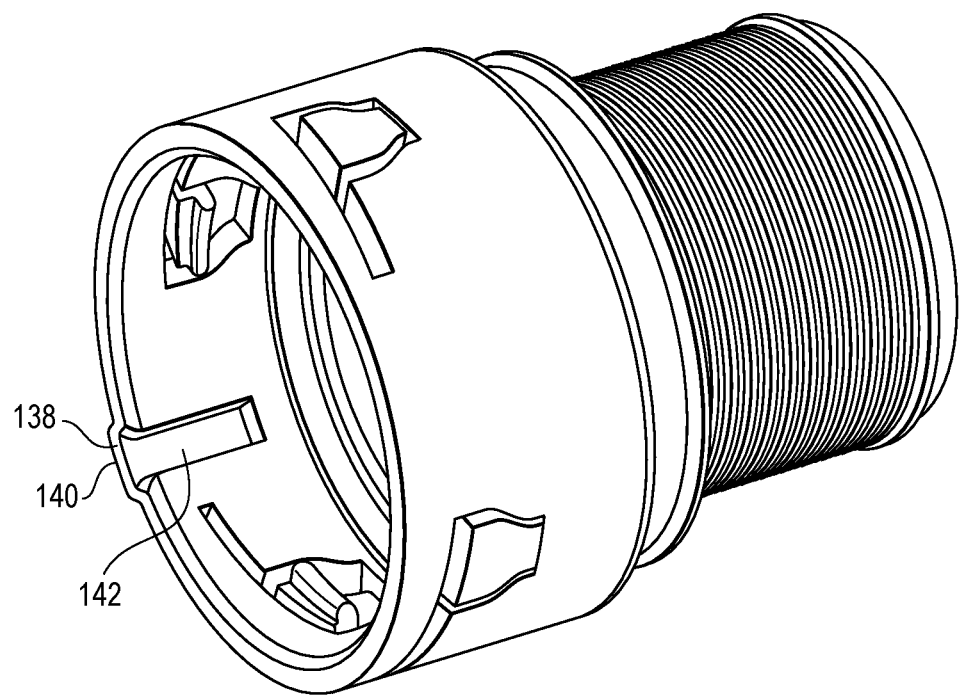
Figure 11:
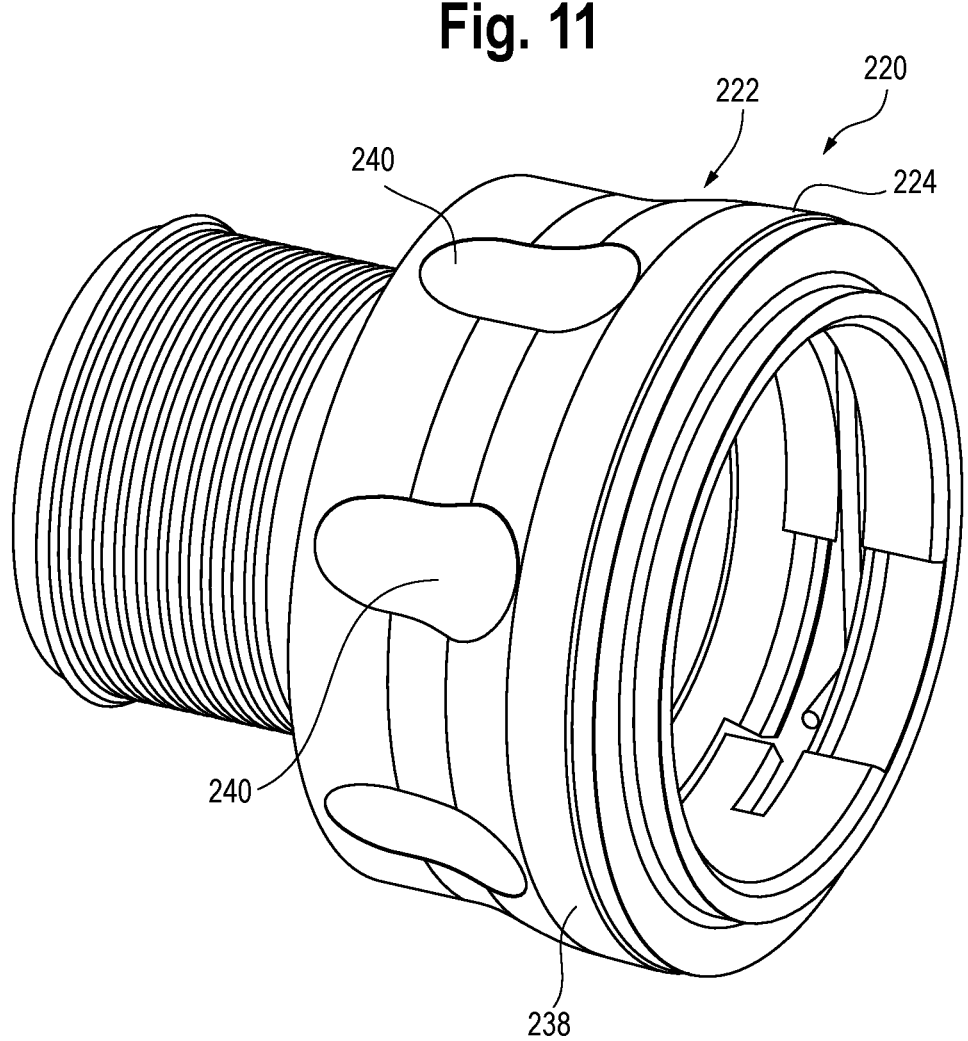
FIG. 11 is a perspective illustration of the female housing of still another embodiment of the quick connector.

The housing 22 can also include a ring retaining element 68 (see FIG. 6A) to maintain the ring 26 mounted to the housing 22, even with the male adapter 24 removed (in an unassembled state). As seen in FIG. 6, the housing 22 includes one or more detents 70 (see FIG. 6A) formed extending inwardly of the housing body 40, between the inlet 34 and the ring groove 38. The detents 70 cooperate with a circumferential channel 72 in the ring 26 and interfere with removal of the ring 26 from the housing 22. The channel 72 (see FIG. 6A) is sufficiently wide so that the ring 26 can move longitudinally, between the unassembled and assembled states.

Figure 4A:
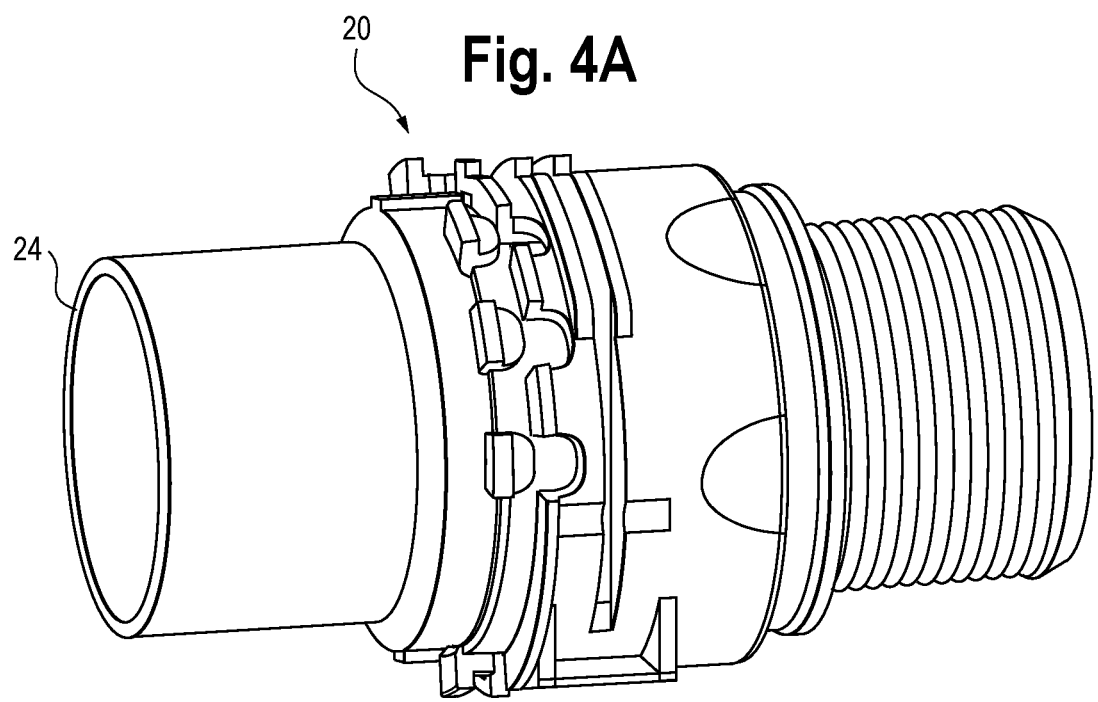
FIGS. 4A and 4B are perspective views of the connector of FIGS. 2 and 3 in an unassembled state (FIG. 4A) and an assembled state (FIG. 4B)
Figure 4B:
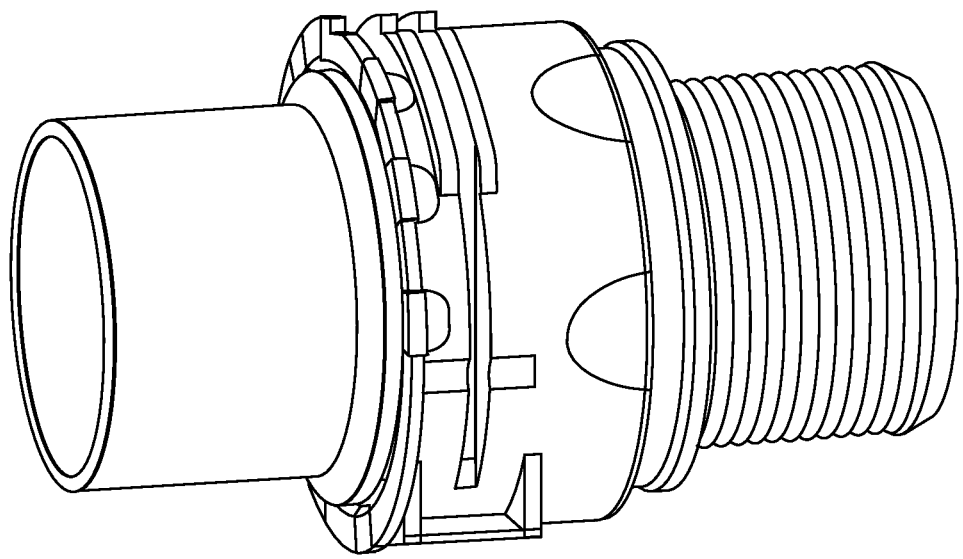
Figure 5A:
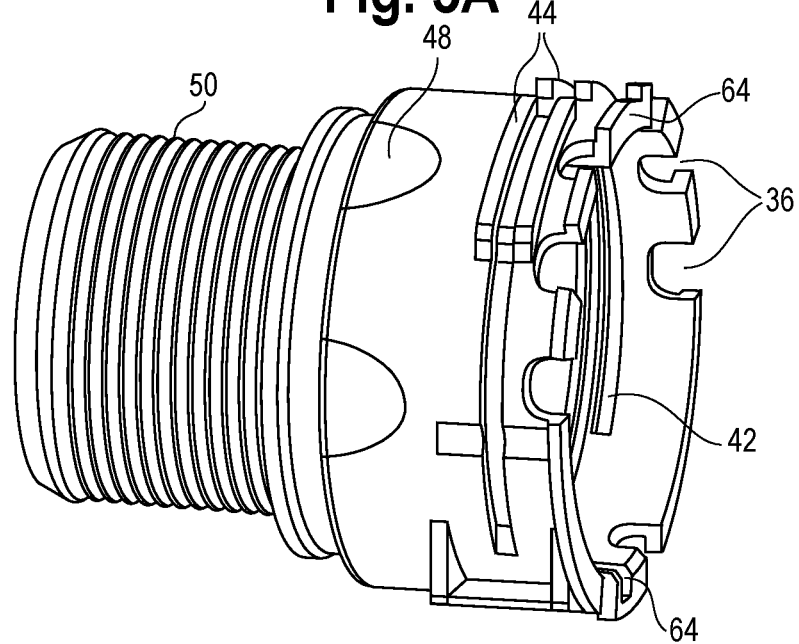
FIGS. 5A and 5B are perspective views of the female housing and slide ring of the connector of FIG. 2.
Figure 5B:
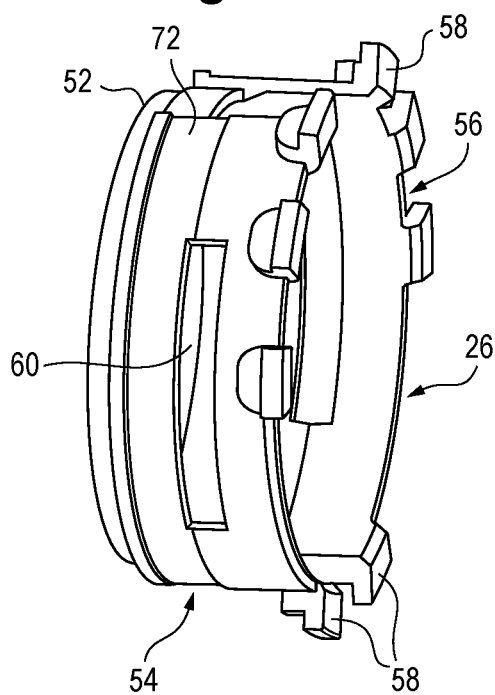

Referring to FIGS. 4A and 4B, the connector 20 is shown in an unassembled or unlocked state and a locked state, respectively. In FIG. 4A, the male adapter 24 is being inserted into the housing 22, but is not yet fully inserted into the housing 22 and the ring 26 is not seated in the housing 22. This is shown by the non-alignment of the ring projections 58 and housing pockets 36.

With the male adapter 24 properly aligned with the housing 22 (the adapter projection 66 is aligned with the aligning channel 64), the male adapter 24 is urged into the sealing ring 26 and the adapter 24 and sealing ring 26 are urged into the housing 22. With the projections 58 and pockets 36 properly aligned, the elongated circumferential openings 42, 60 in the housing body 40 and sealing ring 26 are also aligned, and the clip legs 32 fall into place in the openings and in the adapter groove 62, as the adapter 24 is urged forward into the housing 22. Alignment of the ring projections 58 in the pockets 36 provides positive, visual indication that the male adapter 24 is fully seated in the housing 22 and locked in place. The alignment of the ring projections 58 in the pockets 36 also provides tactile indication in that a user can feel whether the projections 58 are aligned in the pockets 36 in that there will be a smooth transition between the projections 58 and the pockets 36. As noted above, when the male adapter 24 is fully seated in the female housing 22 and sealing ring 26, the housing and ring openings 42, 60 are aligned so that the spring clip legs 32 lock into the male adapter groove 62.

To remove the male adapter 24 from the housing 22, the clip 30 is pulled to an unseated state (pulled up) so that the ends of the clip legs 32 rest in the clip end rests 46 and the male adapter 24 is urged from the housing 22. This also unseats the sealing ring 26 (so that the projections 58 are unseated from the pockets 36). To reset the connector 20, the clip 30 is urged by downward onto the housing 22 so that the clip legs 32 are once again in the elongated circumferential openings 42 in the housing 22.

An embodiment of the quick connector with positive locking indication 120 is illustrated in FIGS. 7-10. In this embodiment, the housing 122 includes one or more inwardly oriented flexible catch elements 124 that cooperate with the circumferential groove 62 in the male adapter 24. As with the prior embodiment the housing 122 includes a ring groove 126 internally to accommodate a seal such as a V-ring or O-ring seal (not shown) and the connector 120 includes a sealing ring 128.

The catch elements 124 are formed (for example, when molded) so that in a resting or unassembled state an outside surface 130 of the elements 124 is flush with an outside surface 132 of the housing 122. A short circumferential channel 134 is formed in the housing 122 along an end of the catch elements 124 and is contiguous with a short leg 136 of the channel 134 that extends a distance beyond and adjacent to an end of the elements 124. The housing 122 can include one or more longitudinal aligning channels 138 to accommodate one or more cooperating aligning projections 66 on the male adapter 24. The aligning channels 138 can be formed by outwardly projecting walls 140 having an inner channel 142 to accommodate the aligning projections 66.

An outer twist ring 144 is positioned on the housing 122 overlying the catch elements 124. The twist ring 144 includes one or more windows 146, each configured to cooperate with one of the catch elements 124. In an unlocked state, the windows 146 overlie a catch element 124. An outwardly projecting slide wall 148 is positioned over the outwardly projecting wall 140 that defines the aligning channel 138. The slide wall 148 is wider than the aligning channel wall 140 to permit the twist ring 144 to move (to be rotated) so that the windows 146 overlie the catch elements 124 and block the catch elements 124 to prevent the elements 124 from flexing outwardly.

In use the twist ring 144 is rotated to the unlocked state, in which the windows 146 overlie the catch elements 124. The male adapter 24 is aligned with the housing 122 so that the aligning channels 138 and adapter projections 66 are aligned with one another. As the adapter 24 is urged into the housing 122, the sloped collar 61 engages the catch elements 124 and the catch elements 124 ride up along the collar 61. When the adapter 24 is fully engaged with the housing 122, the catch elements 124 will engage or seat in the adapter groove 62. Once the catch elements 124 are fully seated in the groove 62, the twist ring 144 can be rotated so that the solid wall portion of the ring 144 overlies the catch elements 124 and prevents the catch elements 124 from flexing outward and disengaging from the adapter groove 62. To maintain the ring 144 on the housing 124, the ring 144 can include a series of tongues 150 that extend inwardly of the ring 144, adjacent to the windows 146. The tongues 150 traverse through and along the circumferential channel 134 along the end of and adjacent the catch elements 124. This provides a guide along which the ring 144 is captured, but can rotate, back and forth, to expose and cover the windows 146, while ensuring that the ring 144 remains on the housing 122.

Because the catch elements 124 must fully engage the adapter groove 62 to allow the ring 144 to rotate, the connector 120 provides positive indication that the male adapter 24 is fully engaged with and seated in the housing 122 when the ring 146 is rotated to the locked position. If the adapter 24 is not fully seated in the housing 122, the ring 144 cannot rotate as the catch elements 124 will extend above the housing surface 132 and into the ring windows 146.

Still another embodiment of the quick connector with positive locking indication 220 is illustrated in FIGS. 11-14. The female housing 222 includes a body 224 having elongated circumferential openings 226, a sliding ring 228 positioned in the body 224, a spring clip 230 that is biased outwardly, and a twist ring 232. The sliding ring 228 has a tab 234 extending forwardly from a front edge 236 thereof, toward an open end of the housing 222. The outside surface 238 of the twist ring 232 can have finger recesses 240 to assist a user in grasping and manipulating the twist ring 232. Visual indicators, such as arrows 242, or other markers can be present on the twist ring 232 and on the housing body 224. Tactile indication may also be provided if the markers 242 are raised from the surfaces of the twist ring 232 and housing body 224 and allow the user to feel whether they are aligned with one another.

Figure 12:
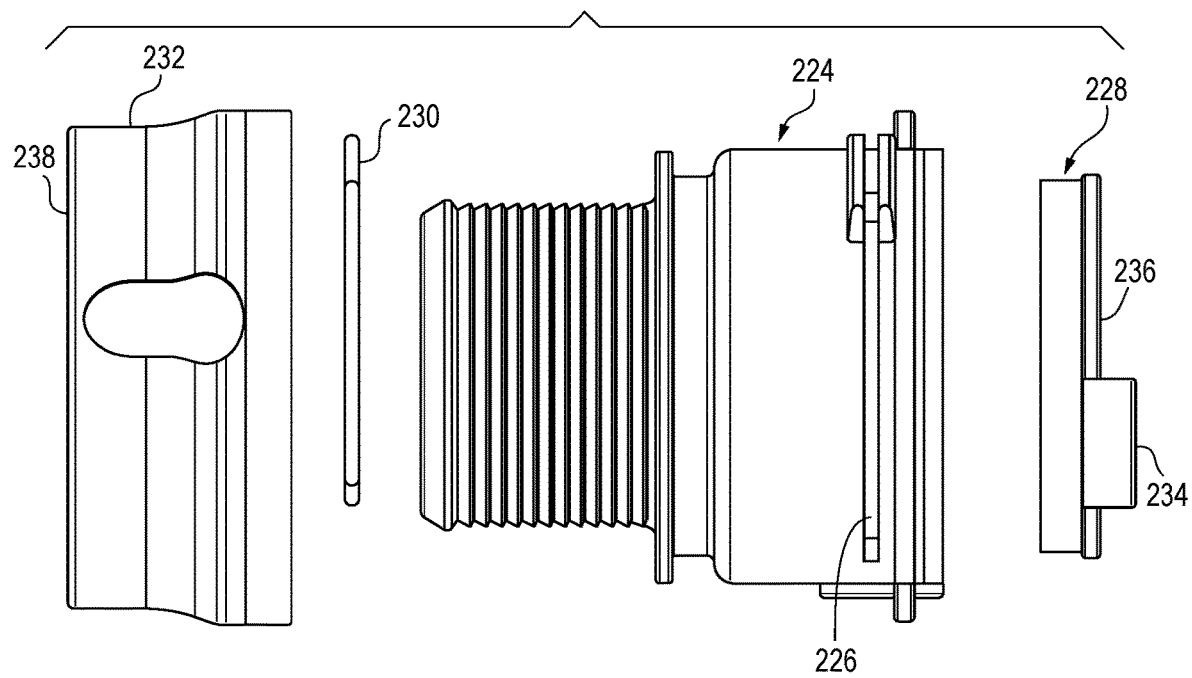
FIG. 12 is an exploded view of the housing of FIG. 11.
Figure 13A:
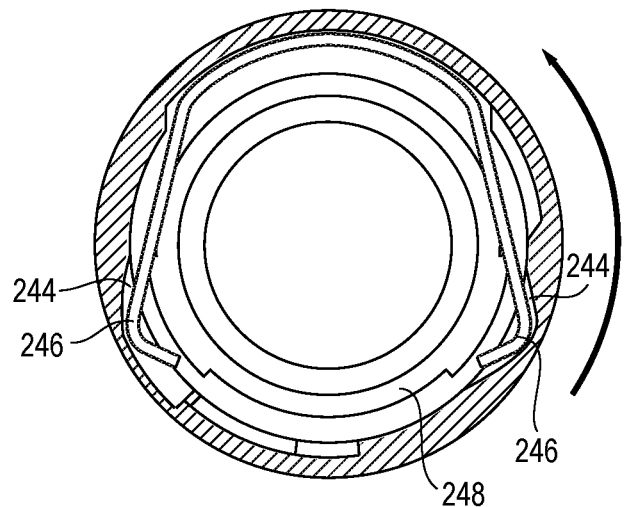
FIGS. 13A and 13B illustrate the spring clip of the housing of FIG. 11 in the unlocked state (13A) and the locked state (13B)
Figure 13B:
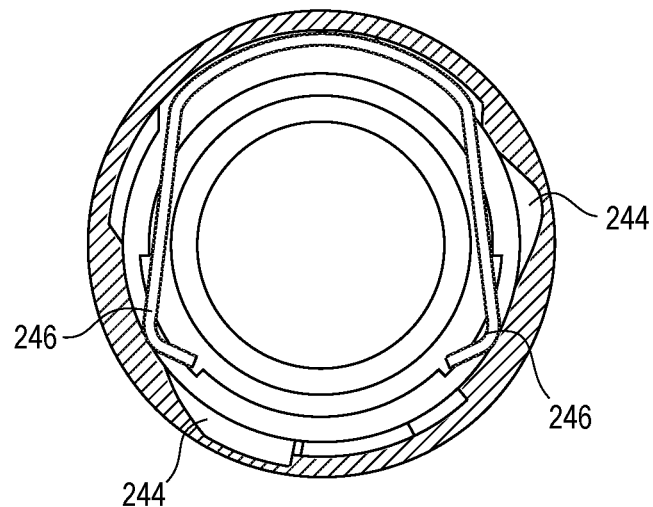
Figure 14:
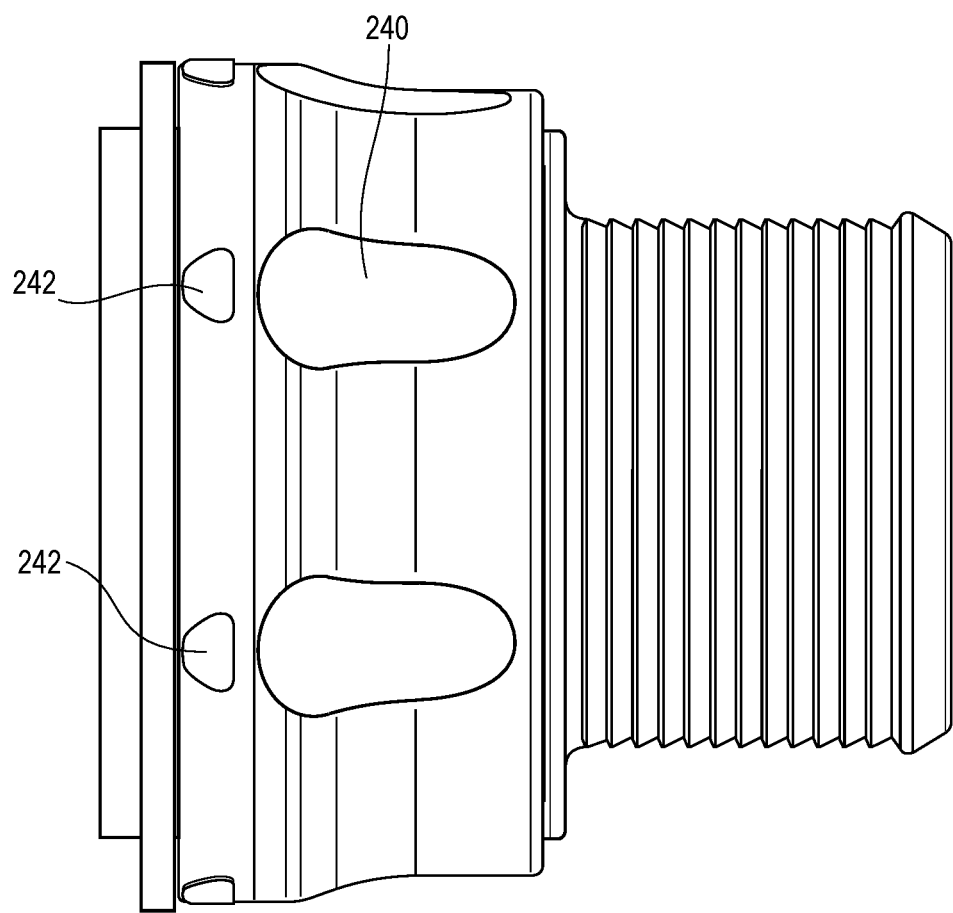
FIG. 14 is an illustration of the female housing of FIG. 11 having a visual state indicator.
Figure 15:
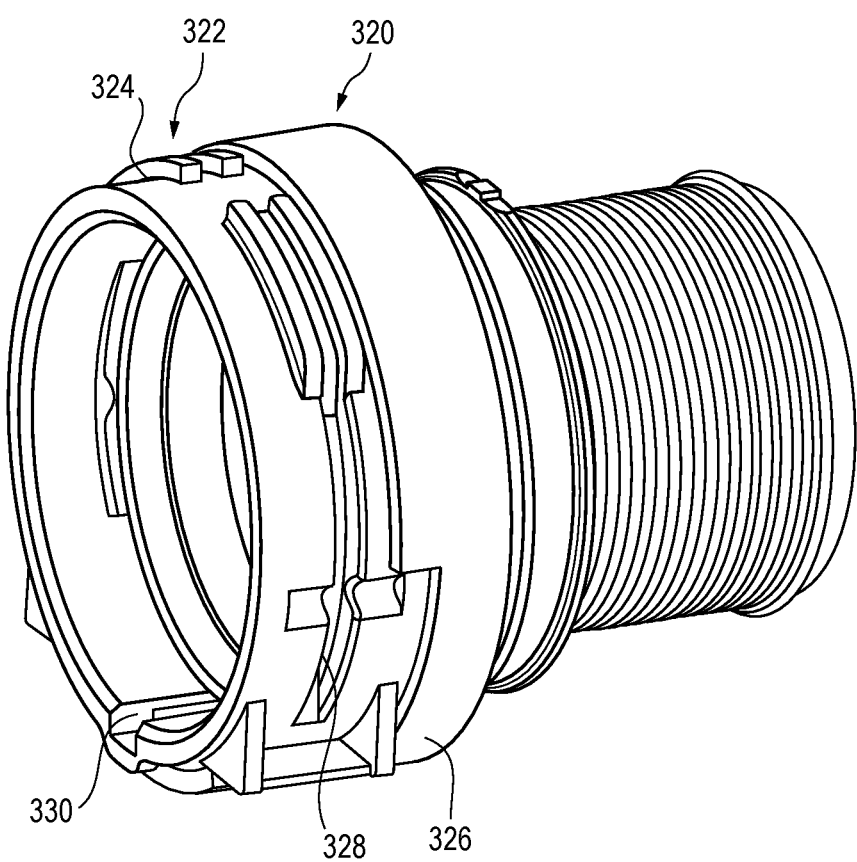
FIG. 15 is a perspective view of still another embodiment of the quick connector with the male adapter shown shadowed.

The twist ring 232 has a series of internal pockets 244 in which the spring clip legs 246 reside when the female housing 222 is in an unlocked state. The pockets 244 allow the legs 246 to expand outwardly. Rotating the twist ring 232 moves the clip legs 246 out of the pockets 244 and compresses the legs 246 (see FIG. 13B) inwardly. Referring to FIGS. 12 and 13A, without the male adapter 24 seated in the housing 222, the front edge 236 of the sliding ring 228, which is in a forward position (toward the open end of the housing) and the tab 234 interfere with and prevent the legs 246 from compressing, which in turn prevents the twist ring 232 from rotating. When the male adapter 24 is inserted into the housing 222, the adapter 24 contacts the tab 234 and the sliding ring 228 which urges the sliding ring 228 into the housing 222, which moves the sliding ring 228 out of interference with the clip legs 246. The twist ring 232 can then be rotated which in turn moves the clip legs 246 out of the pockets 244 and compresses the legs 246 (see FIG. 13B) which lock into the male adapter groove 62. The markers 242 on the twist ring 232 and housing body 224 can be positioned so that the markers 242 align when the twist ring 232 is in the locked state. The quick connector 220 thus provides positive visual indication of the state of the connector 220 by visually inspecting alignment of the markers 242 on the twist ring 232 and housing body 224. If the alignment markers 242 are raised on or recessed in the twist ring 232 and housing body 224, tactile indication can also be provided.

Yet another embodiment of the quick connector with positive locking indication 320 is illustrated in FIGS. 15-20B. The female housing 322 includes a housing body 324 and an external sliding indicator ring 326 to provide positive indication of locking of the male adapter 24 and female housing 320. The longitudinal location of the sliding indicator ring 326 on the housing 322 indicates the state of the connector 320.

In this embodiment the housing 322 is formed having elongated circumferential openings 328 to accommodate a spring clip (not shown) and one or more longitudinal aligning channels 330 to accommodate one or more cooperating aligning projections 66 on the male adapter 24.

Figure 16:
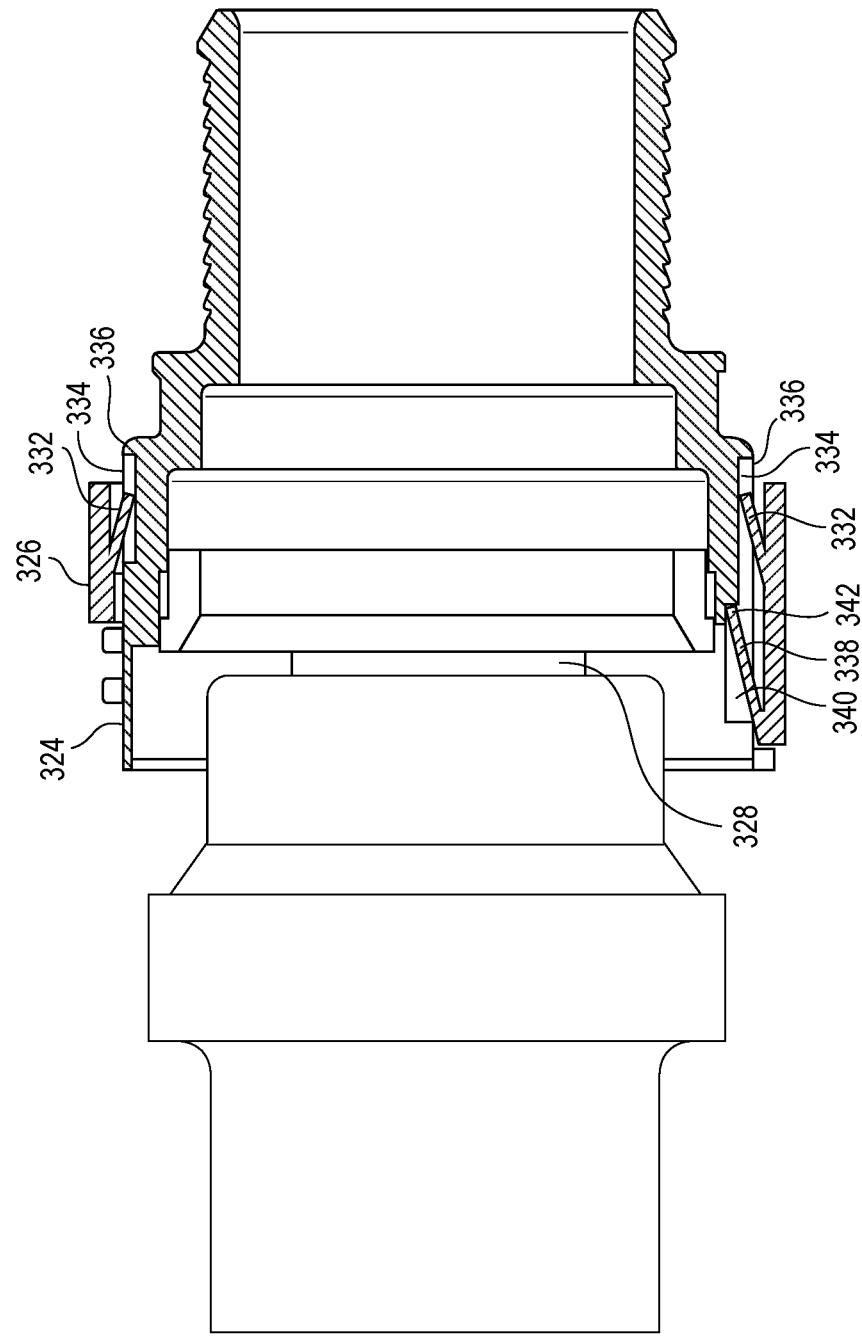
FIG. 16 is a sectional view of the quick connector of FIG. 15, shown with the male adapter being inserted into the female housing.

Referring to FIG. 16, in an embodiment, the sliding indicator ring 326 includes a pair of circumferentially opposing inwardly oriented flexible tabs 332 that engage a channel 334 in the housing body 324. The tabs 332 engage the channel 334 as the sliding indicator ring 326 slides between a first or forward position (FIG. 16) in which the ring 326 indicates that the male adapter 24 is not fully engaged with the housing 322 and a second rearward position (FIG. 17) in which the ring 326 indicates that the male adapter 24 is fully engaged with the housing 322. The tabs 332 are biased outwardly to maintain positive engagement with the housing 322 and are prevented from passing beyond the fully engaged position by stop walls 336 in the channel 334.

Figure 19:
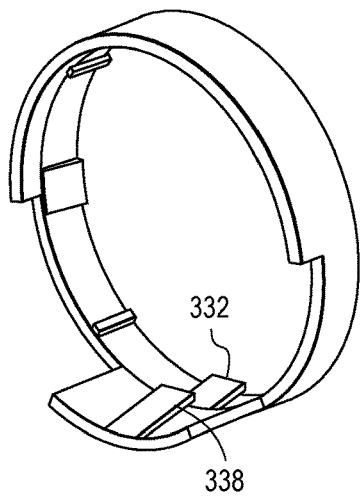
FIG. 19 is a perspective view of the outer ring of the housing of FIG. 15.
Figure 20A:
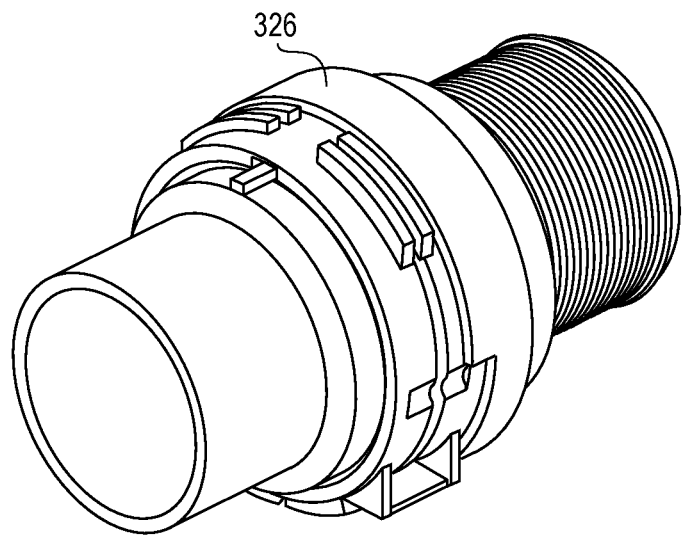
FIGS. 20A and 20B are perspective views of the connector shown in the unassembled (FIG. 20A) and assembled (FIG. 20B) states.
Figure 20B:
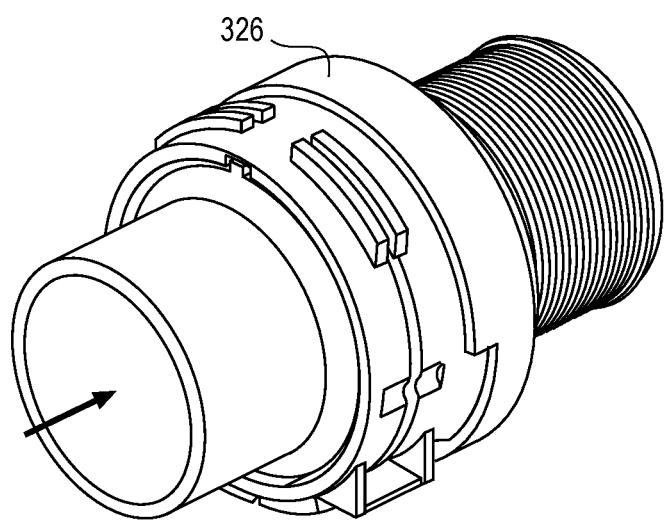
Figure 21:
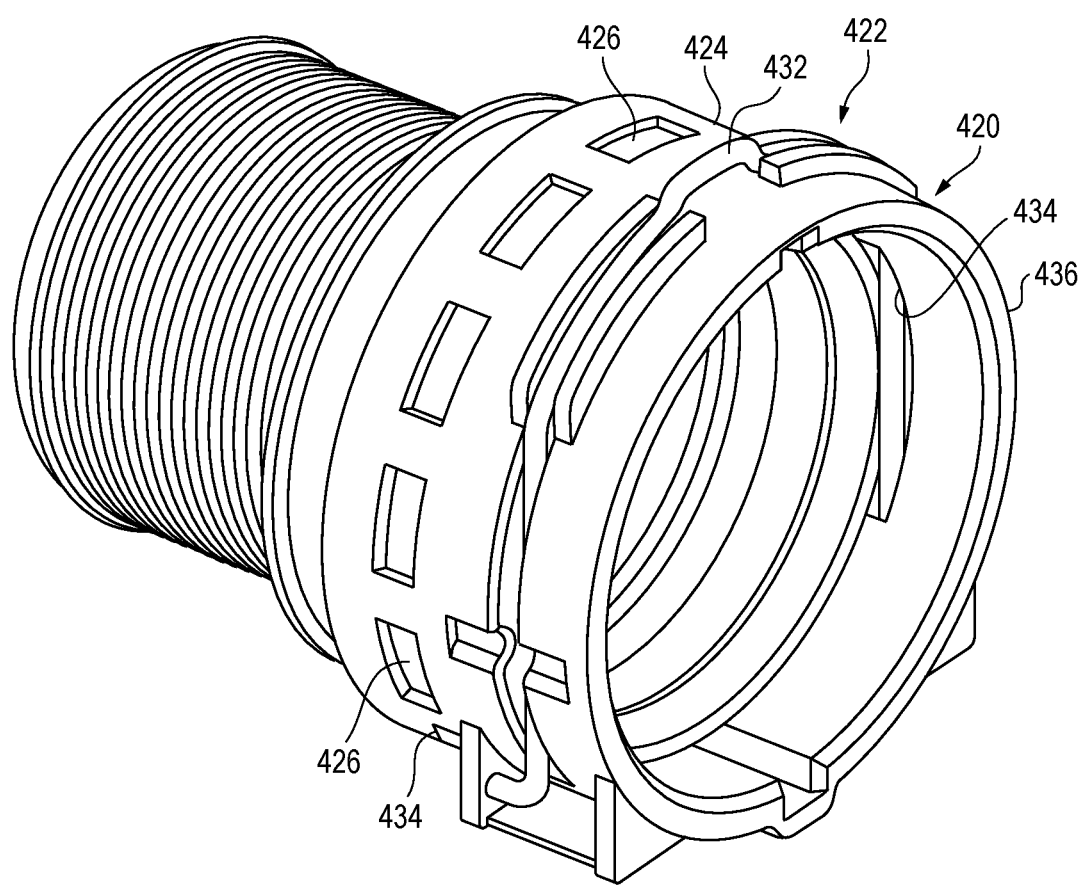
FIG. 21 is a perspective illustration of yet another embodiment of the quick connector with the male adapter shown shadowed.
Figure 22:
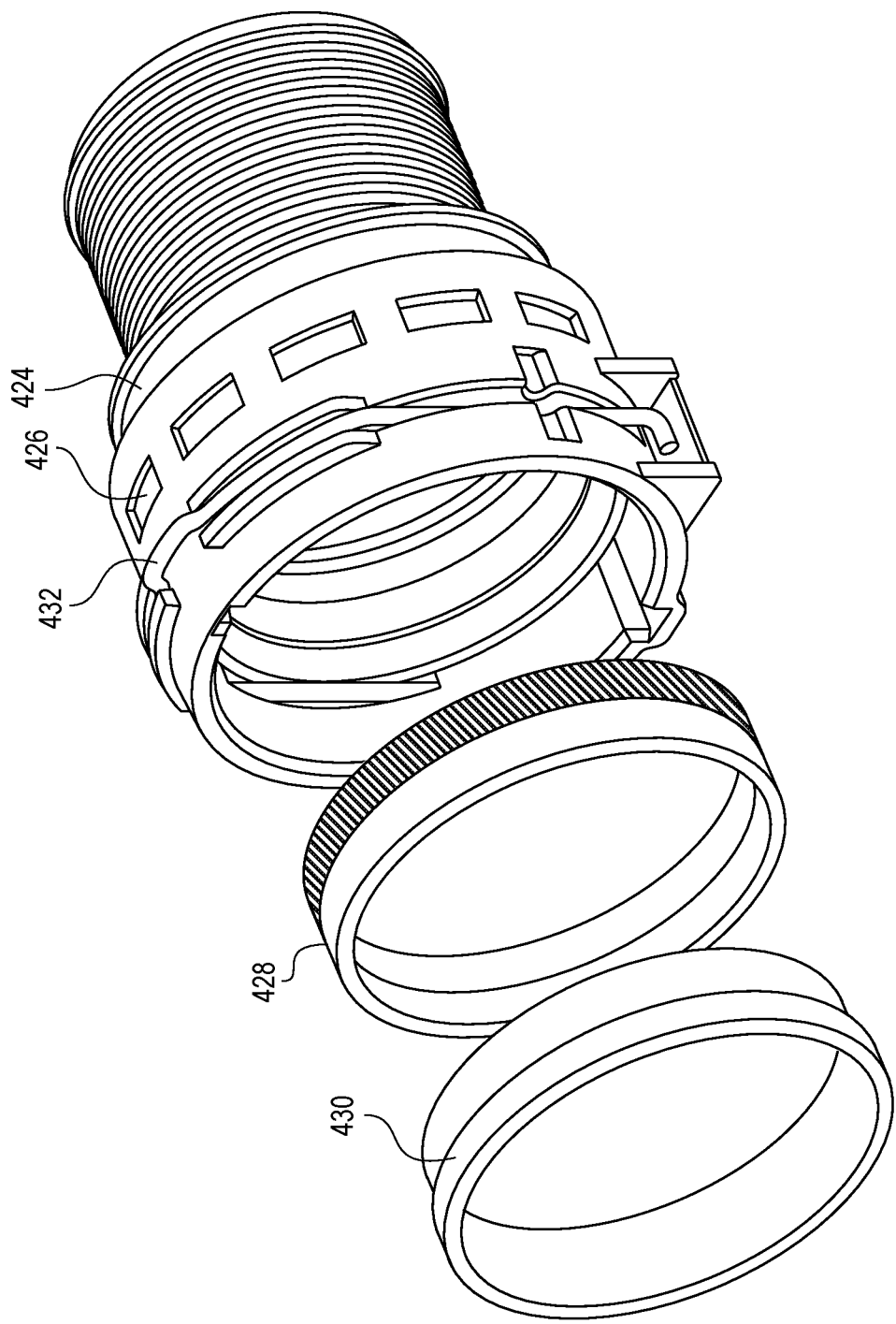
FIG. 22 is an exploded view of the connector of FIG. 21.

As illustrated in FIGS. 16 and 19, the sliding indicator ring 326 includes an additional tab, a release tab 338, that is forward of the pair of tabs 332. The release tab 338 moves within a release tab channel 340 that is formed in one of the first tab channels 334 and is further open to one of the longitudinal aligning channels 330 in the housing body 324. The release tab 338 locks and releases the sliding indicator ring 326 to prevent or allow movement of the ring 326 between the forward and rearward positions. The release 338 tab is biased outwardly and engages a stop wall 342 in the release tab channel 340 to prevent movement of the sliding indicator ring 326 (see FIG. 16).

Figure 17:
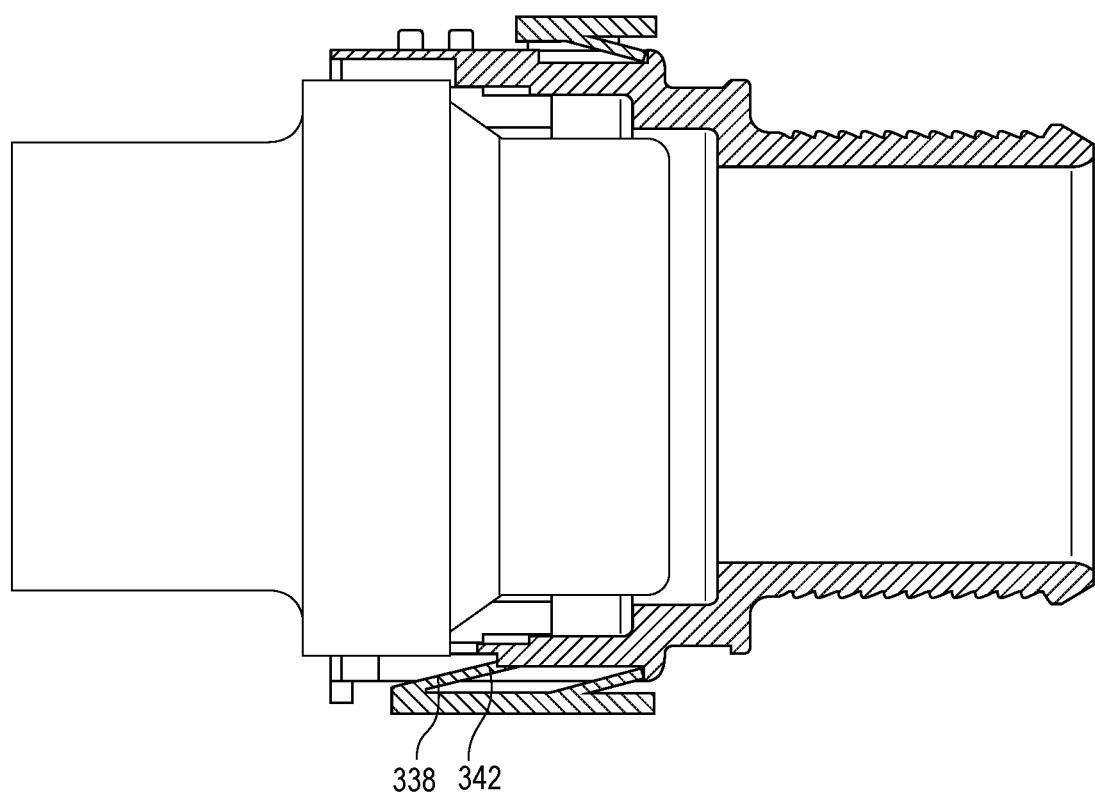
FIG. 17 is a view similar to FIG. 16 showing the male adapter further inserted into the female housing, with the male adapter in position to urging the locking finger into the free position.
Figure 18A:
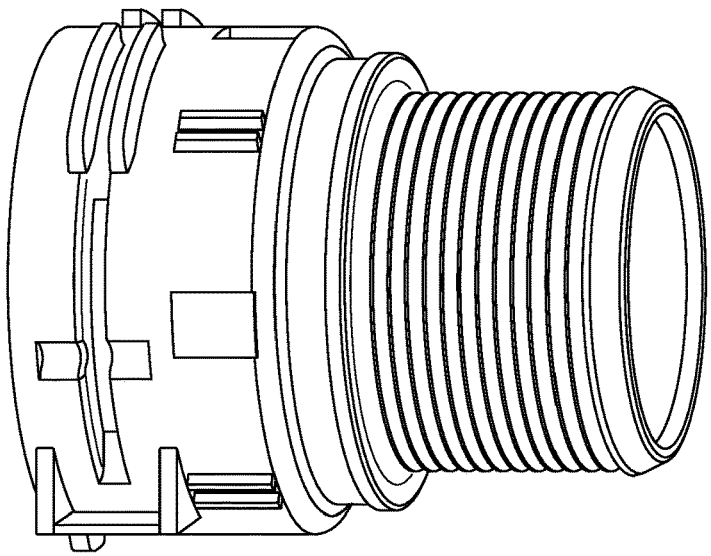
FIGS. 18A and 18B are perspective views of the female housing of FIGS. 15-17, FIGS. 18A and 18B being rotated about 180 degrees relative to one another.
Figure 18B:
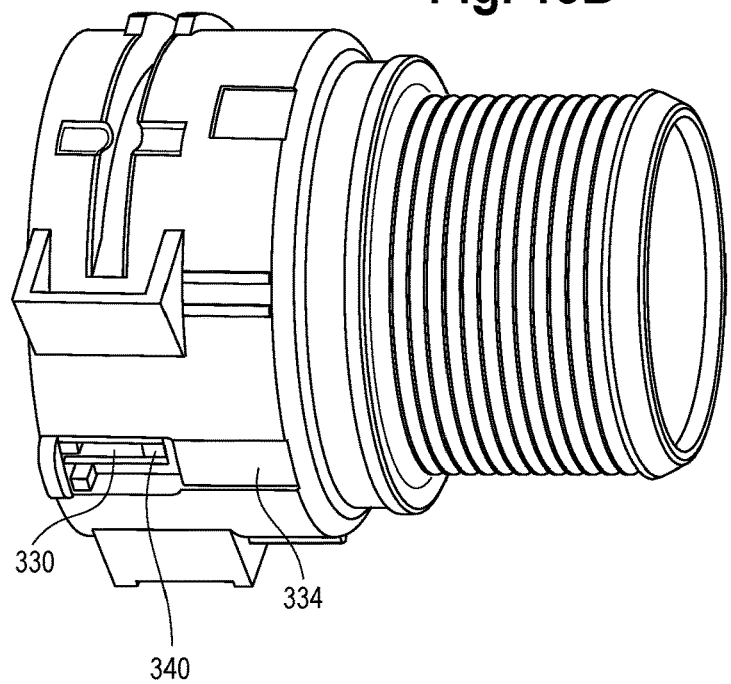

Referring to FIG. 17, the release tab 338 is configured to cooperate with one of the male adapter aligning projections 66. As the male adapter 24 is inserted into the housing 322, the aligning projection 66 contacts the release tab 338 and urges the release tab 338 outwardly, which disengages the release tab 338 from the releaser tab channel stop wall 342. This allows the sliding indicator ring 326 to slide rearwardly, to indicate that the male adapter 24 is fully seated in the housing 322 and is locked in place.

Still another embodiment of the quick connector with positive locking indication 420 is illustrated in FIGS. 21-23B. In this embodiment, the female housing 422 includes a body 424 having a plurality of circumferentially extending windows 426, an indicator ring 428, a sliding ring 430 and a spring clip 432. The indicator ring 428 can be formed, for example, having two colors, for example, a red portion and a black portion, each extending along a longitudinal portion of the indicator ring 428. The indicator ring 428 is engaged by the sliding ring 430 and is moved longitudinally through the housing body 424 by the sliding ring 430.

Figure 23A:
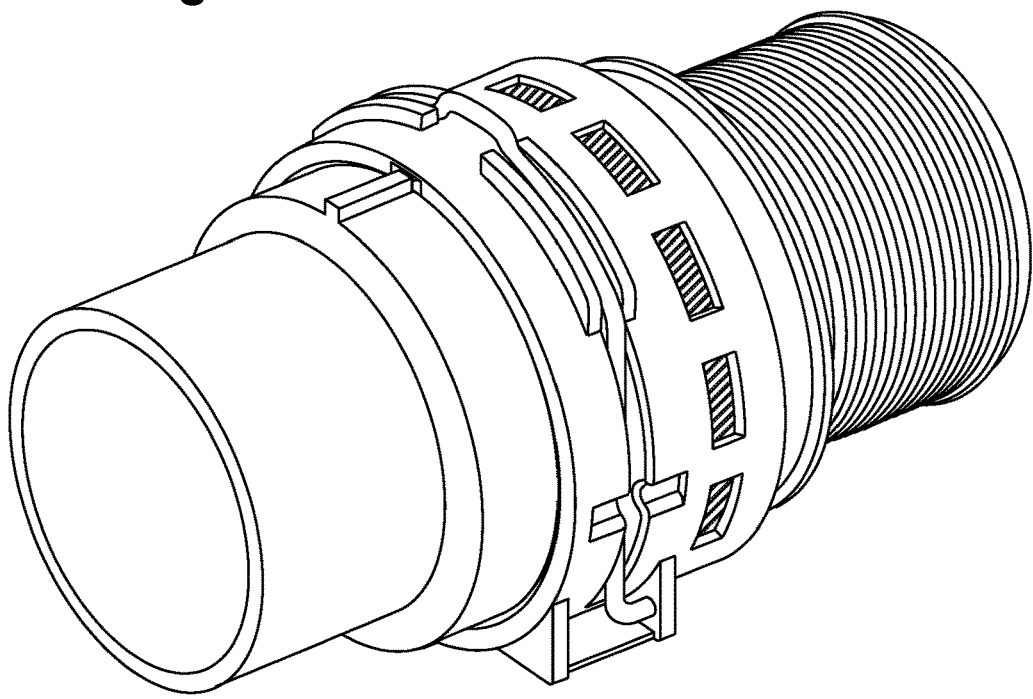
FIGS. 23A and 23B are perspective views of the connector shown in the unassembled (FIG. 23A) and assembled (FIG. 23B) states.
Figure 23B:
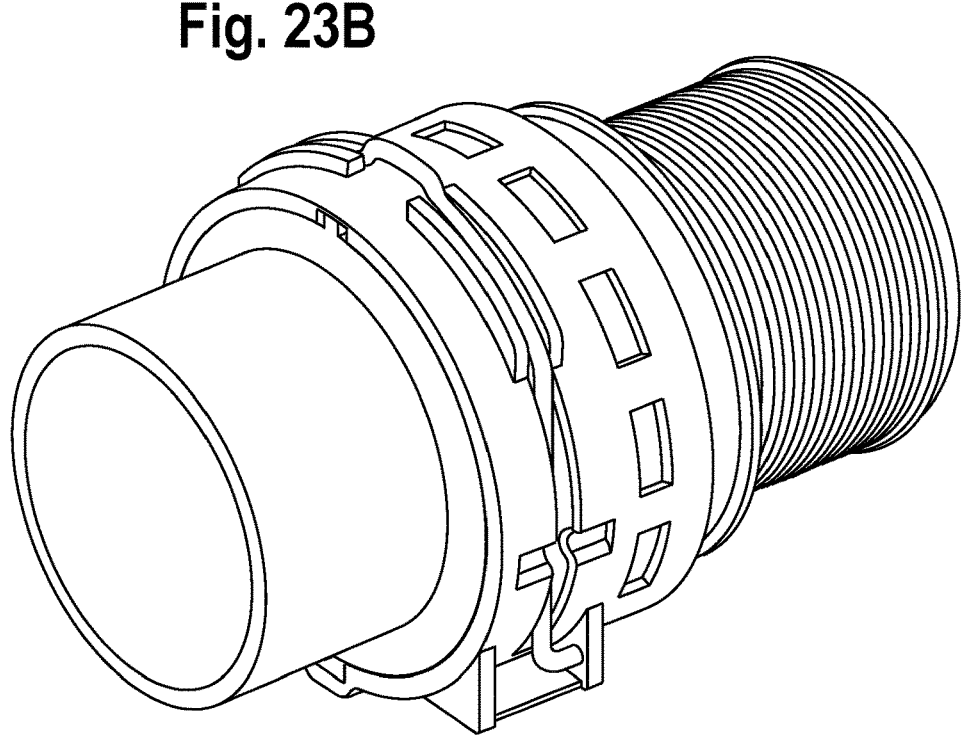

Referring to FIGS. 23A and B, in the unassembled state (FIG. 23A), the male adapter 24 is not yet fully engaged with the housing 422 and the sliding and indicator rings 430, 428, and a forward portion or color (for example, the black portion) of the indicator ring 428 visible in the windows 426. As the male adapter 24 is fully engaged with the housing 422, the sliding ring 430 urges the indicator ring 428 rearward so that the second portion or color (for example, the red portion) of the indicator ring 428 is visible in the windows 426. In this position, the indicator ring 428 is beyond the housing longitudinal openings 434 and the clip legs 436 have passed over the sloped collar 61 and locked into the groove 62 in the adapter 24 to secure the adapter 24 and housing 422 to one another.

Figure 25A:
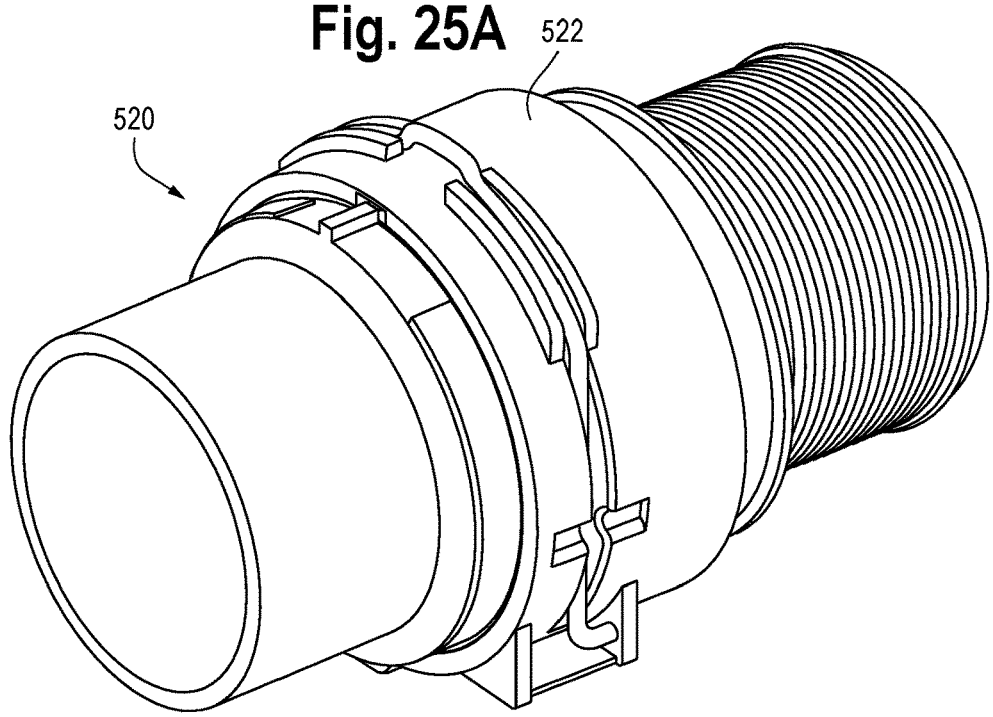
FIGS. 25A-25B are perspective views of the connector shown in the unassembled (FIG. 25A) and assembled (FIG. 25B) states.
Figure 25B:
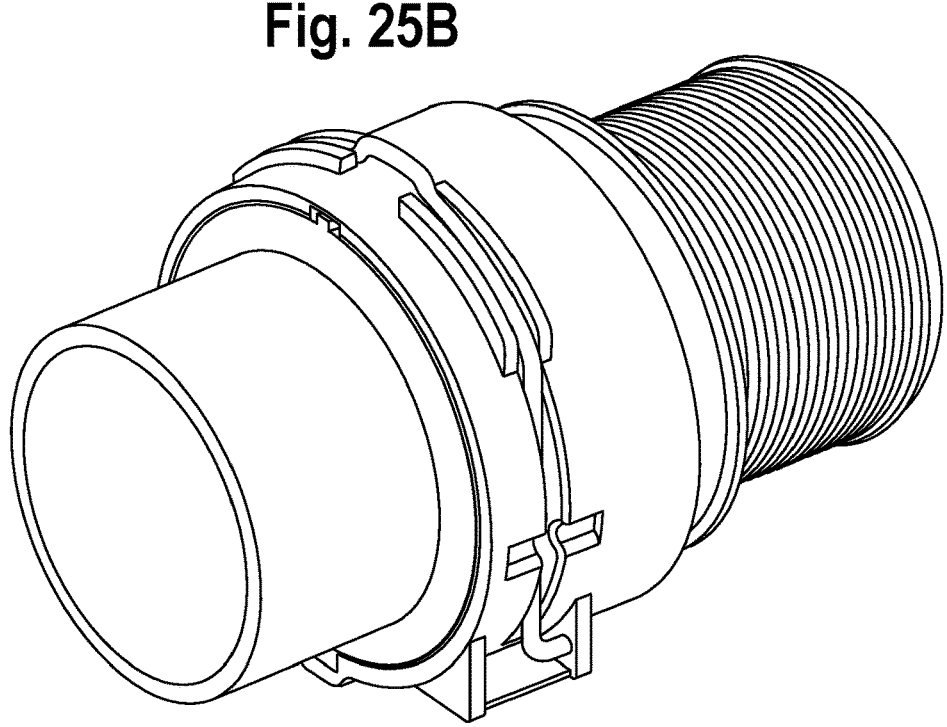

Yet another embodiment of the quick connector with positive locking indication 520 is illustrated in FIGS. 24-25B. In this embodiment, an end 522 of the sliding ring 524 is an external indicator to indicate the state of the connector 520. The sliding ring 524 has a pair of circumferentially opposed openings 526 that cooperate with the spring clip legs 528. When in the unassembled state (FIG. 25A), the end 522 of the ring 524 is exposed indicating that the male adapter 24 is not engaged with the female housing 530, and the wall of the sliding ring 524 adjacent to the openings 526 interferes with the spring clip legs 528 closing. With the male adapter 24 fully seated in the housing 530 it urges the sliding ring 524 rearward, into the housing 530 (to hide the end 522 of the sliding ring 524—the indicating portion) and the opposed openings 526 in the sliding ring 524 align with the housing openings 532 and clip legs 528 to allow the clip legs 528 to close into the male adapter groove 62.

Figure 26B:
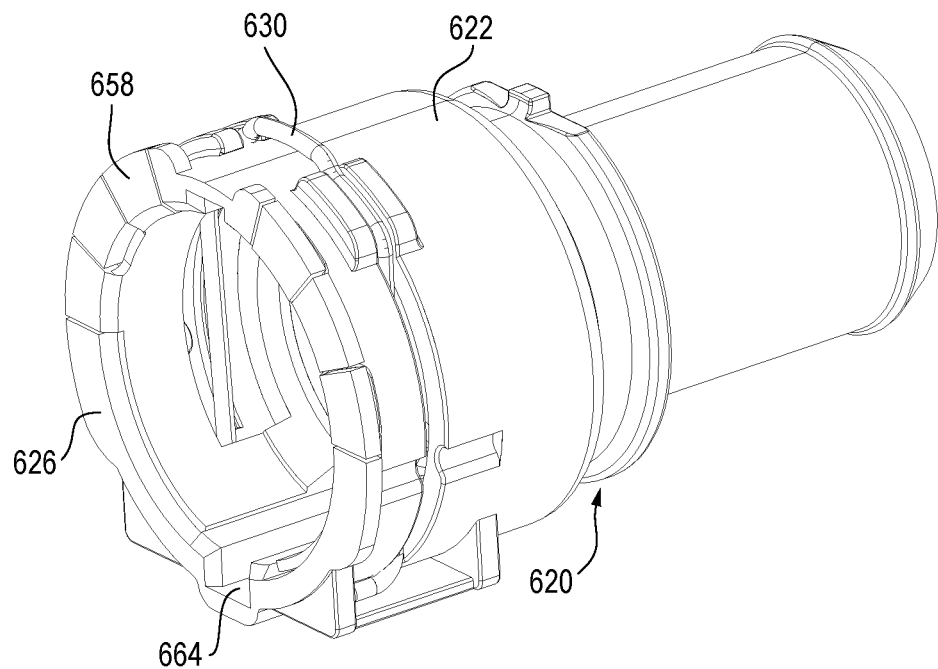

Still another embodiment of the quick connector with positive lock indication 620, is shown in FIGS. 26A and 26B. In this embodiment, the female housing 622 includes a series of pockets 636 and the sealing ring 626 includes a series of projections 658, similar to the prior embodiments. The ring 626 can include an aligning projection (not shown) that cooperates with the female housing aligning channel 664 to ensure that the ring 626 and female housing 622 are properly aligned. The other features, such as those to support and retain the spring clip 630 on the female housing 622 and between and when the ring 626 is properly seated in the female housing 622 are also present in this embodiment.

A seal 628 is positioned in the female housing 622 and sits between a seal abutment 668 the female housing 622 and the sealing ring 626 when the sealing ring 626 is in place in the housing 622.

As best seen in FIG. 26A, an end 676 of the sealing ring 626 includes a series of helical or spiral formed legs 678 that define a circumferential radius about equal to the circumference of the sealing ring end 676. That is, the legs 678 are axially aligned with the sealing ring end 676. The legs 678 are formed so as to flex toward and away from the sealing ring end 676, and to bias the sealing ring 626 away from the female housing 622, to unseat the sealing ring 626 and as such, to unseat the sealing ring projections 658 from the female housing pockets 636.

In an embodiment, the legs 678 contact or cooperate with an abutment 668 in the housing 622. That is, the legs 678 compress against the abutment portion 688 as the sealing ring 626 properly seats in the housing 622. This arrangement provides, as in the prior embodiments, both visual and tactile indication of whether the sealing ring 626 is properly seated in the female housing 622 in that the projections 658 are seated in and flush with the pockets 636 when the sealing ring 626 is properly seated in the housing 622.

The legs 678 can be formed through wall, that is formed from the entirety of the thickness of the wall at the sealing ring end 676, or it they can be formed from a portion of the wall, that is less than the entire thickness of the end 676 wall.

When formed as a portion of the thickness of the end 676 wall, the legs 678, when flexed rearward, can seat in recesses 680 in the wall. Such a configuration facilitates protecting the legs 678. Moreover, in this configuration, the circumferential arrangement of the legs 678 is such that they do not occupy the area in which the sealing ring 626 acts to retain the seal 628 in place in the housing 622. The housing can be formed with slots or cut-outs 682 in the sidewall to accommodate the legs 678 and to prevent rotation of the sealing ring 626 relative to the housing 622.

Figure 27A:
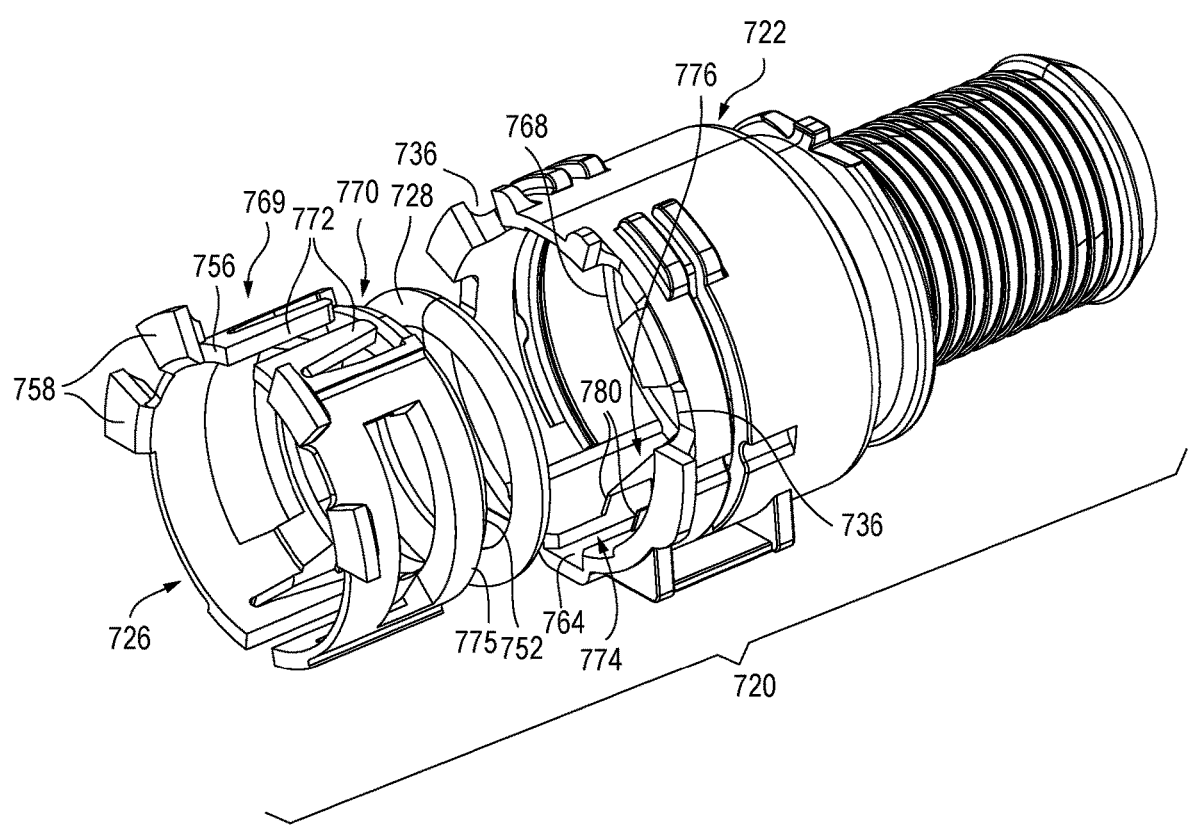
FIGS. 27A and 27B are exploded and perspective views of the female housing of yet another embodiment of the quick connector.
Figure 27B:
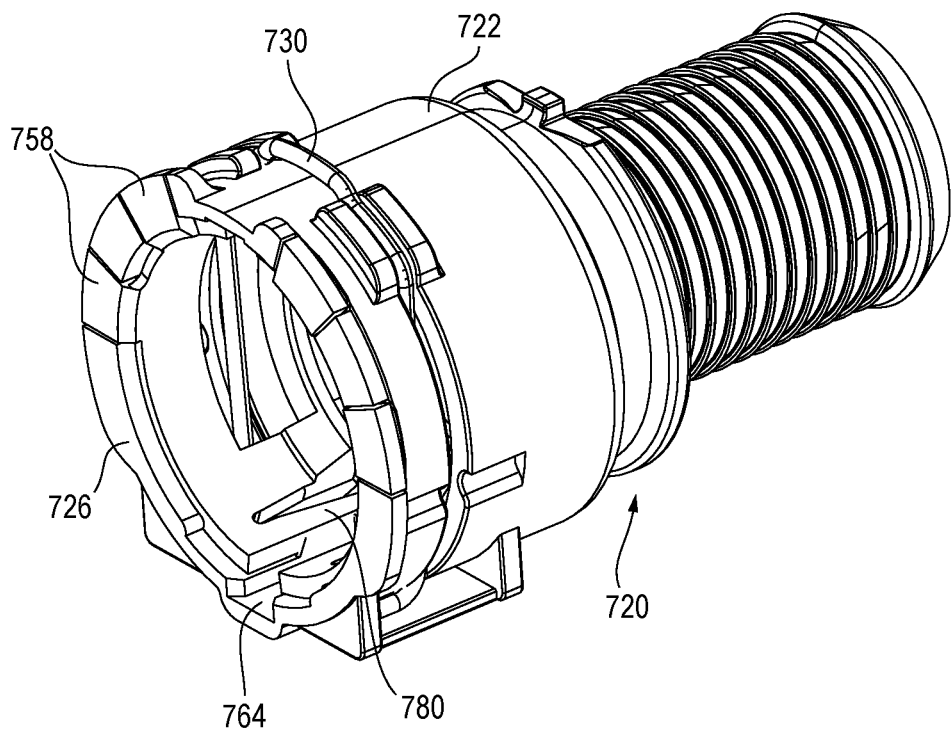

Yet another embodiment of the quick connector with positive lock indication 720, is shown in FIGS. 27A and 27B. In this embodiment, the female housing 722 includes a series of pockets 736 and the sealing ring 726 includes a series of projections 758, similar to the prior embodiments. The ring 726 can include an aligning projection (not shown) that cooperates with the female housing aligning channel 764 to ensure that the ring 726 and female housing 722 are properly aligned. The other features, such as those to support and retain the spring clip 730 on the female housing 722 and between and when the ring 726 is properly seated in the housing 722 are also present in this embodiment.

A seal 728 is positioned in the female housing 722 and sits between an abutment 768 in the female housing 722 and the sealing ring 726 when the ring 726 is in place in the housing 722.

As best seen in FIG. 27A an end 775 of the ring 726 includes a circumferential abutment portion 752. In an embodiment, an intermediate portion 769 of the sealing ring 726 includes a partially open region 770 having a pair of linear or generally longitudinally extending flexible legs 772 that depend from an end 756 proximal the projections 758. The legs 772 are formed radially outwardly of the abutment portion 752. The legs 772 are configured to flex outwardly, circumferentially from each other and serve as a spring, as is detailed below. In an embodiment, two pairs of legs 772 are formed, each on circumferentially opposing sides of the ring 726.

The female housing 722 includes a receiving region 774 to receive the ring legs 772. In an embodiment, the receiving region 774 includes a longitudinally extending wedge-shaped projection or wall 776 on an inner surface 778 thereof. The wedge wall 776 is configured to cooperate with the legs 772 to bias the sealing ring 726 outwardly, away from the housing 722 until it is full seated in the housing 722. In an embodiment, the wedge wall 776 has a pair of mirror-image wedges 780 that cooperate with the pair of legs 772. In an embodiment, the female housing 722 has receiving regions 774 formed on circumferentially opposing sides of the housing 722 to accommodate a sealing ring 726 configuration having a two pairs of legs 772. In some embodiments, the sealing ring 726 includes an aligning projection (not shown) that cooperates with the housing aligning channel 764 (and as illustrated in the prior embodiments) to assure that the sealing ring 726 and female housing 722 are properly aligned with one another. The aligning projection can be positioned between the legs 772 of one of the pair of legs and the aligning channel 764 can, likewise, be positioned between the wedges 780 of one of the receiving regions 774. This arrangement provides, as in the prior embodiments, both visual and tactile indication of whether the sealing ring 726 is properly seated in the female housing 722 in that the projections 758 are seated in and flush with the pockets 736 when the sealing ring 726 is properly seated in the housing 722.

In addition to the biasing function provided by the legs 772 acting against or cooperating with the wedges 780, the interaction of the legs 772 in the receiving regions 774 serves to prevent rotation of the sealing ring 726 relative to the housing 722.

It will be appreciated that in the embodiments 620 and 720 shown in FIGS. 26A,B and 27A,B, the sealing ring is translated between the seated and unseated positions by a component other than the seal, by an axial force applied to the sealing ring. In the embodiment of FIGS. 26A,B the force is provided by a sealing ring having spiral or helical legs 678 that cooperate with the abutment wall 668 to unseat the sealing ring from the housing 622 and in the embodiment of FIGS. 27A,B, the force is provided by linear legs 772 that cooperate with the wedges 780. It will, however, be appreciated that the bias function can be provided using other spring configurations.

In addition, the under-surfaces of the projections 658, 758, that is those surfaces that form a juncture with the body of their respective rings, 626, 726, can be radiused or rounded to provide additional tactile indication of the alignment of the rings 626, 726 with their respective housings 622, 722.

It will be appreciated by those skilled in the art that the seal (such as that shown in FIG. 3), for example, the V-seal, is required in each of the disclosed embodiments, whether shown or described. It will, however, be appreciated that other types and profiles of seals and cooperating ring grooves can be used and are within the scope and spirit of the present disclosure.

It will also be appreciated from the above disclosure and the accompanying figures that the present quick connector with positive lock indication provides numerous advantages over known quick connect couplings. Whereas known coupling function well to secure the male adapter to the female housing they lack the visual or tactile indication of secure connection or coupling of the male adapter and female housing provided by the present connector.

It will also be appreciated by those skilled in the art that the relative directional terms such as upper, lower, rearward, forward and the like are for explanatory purposes only and are not intended to limit the scope of the disclosure.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within its scope.

We claim:

1. A quick connector assembly comprising:
   a male adapter portion having an end and a groove formed therein spaced from the end, the male adapter portion having a first through bore;
   a female housing portion having a body, the body having a second through bore generally concentrically aligned with the first through bore, the second through bore having an interior surface;
   a twist ring having a series of internal pockets, the twist ring configured to cooperate with the female housing and the male adapter:

a spring clip; and a sliding ring that is configured to slide adjacent to the internal surface, wherein the twist ring is in a first position when the male adapter is engaged with the female housing by the spring clip, and wherein the twist ring is in a second position, different from the first position, when the male adapter is other than engaged with the female housing, and the sliding ring contacts the spring clip.

2. The connector assembly of claim 1 wherein the first and second positions are visually different from one another.

3. The connector assembly of claim 1 including tactile indication that the male adapter is engaged with the female housing and that the male adapter is not engaged with the female housing.

4. The connector assembly of claim 1, wherein the female housing includes a pair of opposing elongated circumferential openings, and wherein the spring clip has one of a pair of legs disposed in each of the pair of opposing elongated circumferential openings, the pair of legs of the spring clip are configured to cooperate with and engage the groove of the male adapter to secure the male adapter in the female housing.

5. The connector assembly of claim 4, wherein the sliding ring includes an edge to interfere with rotating the twist ring when the male adapter is disengaged from the female housing and wherein when the male adapter is engaged with the female housing the sliding ring is urged inwardly of the female housing moving the edge out of interference with movement of the twist ring.

6. The connector assembly of claim 5, wherein the pair of legs of the spring clip are biased inwardly to engage the groove in the male adapter to secure the male adapter to the female housing.

7. The connector assembly of claim 4, wherein the groove of the male adaptor and each of the pair of opposing elongated circumferential openings intersect a common plane when the male adaptor and the female housing are engaged.

8. The connector assembly of claim 1, wherein the twist ring is capable of moving from the second position to the first position by inserting the male adaptor into the second through bore to move the sliding ring until the sliding ring can no longer contact the spring clip, and rotate the twist ring so that the spring clip is unseated from the plurality of pockets.

9. The connector assembly of claim 1, wherein the sliding ring includes a front edge configured to engage a front surface of the male adaptor, and a tab that extends from the sliding ring beyond the front edge.

\* \* \* \* \*